US011980785B2

(12) United States Patent
Mu et al.

(10) Patent No.: US 11,980,785 B2
(45) Date of Patent: May 14, 2024

(54) FOAM PRODUCING METHOD, FIRE EXTINGUISHING METHOD, AND APPLIANCE FOR FOAM EXTINGUISHING

(71) Applicants: CHINA PETROLEUM & CHEMICAL CORPORATION, Beijing (CN); CHINA PETROLEUM & CHEMICAL CORPORATION QINGDAO RESEARCH INSTITUTE OF SAFETY ENGINEERING, Qingdao (CN)

(72) Inventors: Shanjun Mu, Qingdao (CN); Chunming Jiang, Qingdao (CN); Weihua Zhang, Qingdao (CN); Quanzhen Liu, Qingdao (CN); Xuqing Lang, Qingdao (CN); Xiaodong Mu, Qingdao (CN); Lin Wang, Qingdao (CN); Jingfeng Wu, Qingdao (CN); Longmei Tan, Qingdao (CN); Zuzheng Shang, Qingdao (CN); Rifeng Zhou, Qingdao (CN); Jianxiang Li, Qingdao (CN); Hui Yu, Qingdao (CN)

(73) Assignees: CHINA PETROLEUM & CHEMICAL CORPORATION, Beijing (CN); CHINA PETROLEUM & CHEMICAL CORPORATION QINGDAO RESEARCH INSTITUTE OF SAFETY ENGINEERING, Qingdao (CN)

( * ) Notice: Subject to any disclaimer, the term of this patent is extended or adjusted under 35 U.S.C. 154(b) by 0 days.

(21) Appl. No.: 18/156,435

(22) Filed: Jan. 19, 2023

(65) Prior Publication Data

US 2023/0149753 A1 May 18, 2023

Related U.S. Application Data

(62) Division of application No. 16/490,728, filed as application No. PCT/CN2018/077196 on Feb. 26, 2018, now Pat. No. 11,559,711.

(30) Foreign Application Priority Data

Mar. 1, 2017 (CN) ........................ 201710116928.X
Mar. 1, 2017 (CN) ........................ 201710116929.4
(Continued)

(51) Int. Cl.
*B01F 23/00* (2022.01)
*A62C 5/02* (2006.01)
(Continued)

(52) U.S. Cl.
CPC .............. *A62C 5/02* (2013.01); *B01F 23/235* (2022.01); *B01F 25/31112* (2022.01);
(Continued)

(58) Field of Classification Search
CPC ............... A62C 5/02; B01F 2215/0422; B01F 2215/0427; B01F 2215/0431; B01F 2215/045; B01F 2215/0468
See application file for complete search history.

(56) References Cited

U.S. PATENT DOCUMENTS 4,729,434 A * 3/1988 Rohrbach ............. A62C 27/00 239/113
5,255,747 A 10/1993 Teske et al.
(Continued)

FOREIGN PATENT DOCUMENTS

CN 1277597 A 12/2000
CN 1517130 A 8/2004
(Continued)

OTHER PUBLICATIONS

He, Baolin, et al., "Research on inert gas/foam combined fire extinguishing technology", Safety in Coal Mines, Jul. 30, 1989. (6 pages).

(Continued)

*Primary Examiner* — Anshu Bhatia

(74) *Attorney, Agent, or Firm* — Buchanan, Ingersoll & Rooney PC

(57) ABSTRACT

A foam production method includes mixing liquid nitrogen with a foaming material to produce foam. A gas is produced in situ from liquid nitrogen. As the ratio of the volume of the gas produced by gasification of liquid nitrogen to the volume of the liquid nitrogen is relatively high, when a large gas supply flow is needed to generate a large foam flow, a liquid nitrogen storage device of a small volume can be used instead of bulky air supply devices such as high-pressure gas cylinders, air compressors, air compressor sets and the like, reducing the volume of the air supply device. In addition, the liquid nitrogen used in foaming will release nitrogen gas after the foam blast, such that the nitrogen is also able to inhibit combustion on the surface of burning materials, accelerating the extinguishing of the fire.

9 Claims, 11 Drawing Sheets

(30) Foreign Application Priority Data

| | | |
|---|---|---|
| Mar. 1, 2017 | (CN) | 201710117015.X |
| Mar. 1, 2017 | (CN) | 201710117707.4 |
| Mar. 1, 2017 | (CN) | 201710119860.0 |
| Aug. 1, 2017 | (CN) | 201710645358.3 |
| Aug. 1, 2017 | (CN) | 201710645441.0 |
| Aug. 1, 2017 | (CN) | 201710645486.8 |
| Aug. 1, 2017 | (CN) | 201710645620.4 |
| Aug. 1, 2017 | (CN) | 201710645701.4 |
| Aug. 1, 2017 | (CN) | 201710645950.3 |
| Aug. 1, 2017 | (CN) | 201710646122.1 |

(51) Int. Cl.

| | |
|---|---|
| ***B01F 23/235*** | (2022.01) |
| ***B01F 25/31*** | (2022.01) |
| ***B01F 25/313*** | (2022.01) |
| ***B01F 27/112*** | (2022.01) |
| *A62C 3/06* | (2006.01) |

(52) U.S. Cl.

CPC .... *B01F 25/31113* (2022.01); *B01F 25/3131* (2022.01); *B01F 27/112* (2022.01); *A62C 3/065* (2013.01); *B01F 2215/0422* (2013.01); *B01F 2215/0427* (2013.01); *B01F 2215/0431* (2013.01); *B01F 2215/045* (2013.01); *B01F 2215/0468* (2013.01); *B01F 2215/0472* (2013.01)

(56) References Cited

U.S. PATENT DOCUMENTS

| | | | |
|---|---|---|---|
| 5,497,833 | A | 3/1996 | Kaylor |
| 6,044,910 | A | 4/2000 | Aebischer et al. |
| 6,623,574 | B1 | 9/2003 | Wu |
| 2010/0032174 | A1 | 2/2010 | Min et al. |
| 2021/0283442 | A1 | 9/2021 | Mu et al. |

FOREIGN PATENT DOCUMENTS

| | | | |
|---|---|---|---|
| CN | 1903805 | A | 1/2007 |
| CN | 2894740 | Y | 5/2007 |
| CN | 101077846 | A | 11/2007 |
| CN | 101205159 | A | 6/2008 |
| CN | 101371944 | A | 2/2009 |
| CN | 101920085 | A | 12/2010 |
| CN | 201681319 | U | 12/2010 |
| CN | 102031103 | A | 4/2011 |
| CN | 102093875 | A | 6/2011 |
| CN | 102500079 | A | 6/2012 |
| CN | 102500080 | A | 6/2012 |
| CN | 102747996 | A | 10/2012 |
| CN | 102838978 | A | 12/2012 |
| CN | 102994069 | A | 3/2013 |
| CN | 202822546 | U | 3/2013 |
| CN | 202937294 | U | 5/2013 |
| CN | 103301590 | A | 9/2013 |
| CN | 203285371 | U | 11/2013 |
| CN | 103590801 | A | 2/2014 |
| CN | 104033143 | A | 9/2014 |
| CN | 104165033 | A | 11/2014 |
| CN | 104405359 | A | 3/2015 |
| CN | 104481490 | A | 4/2015 |
| CN | 104531129 | A | 4/2015 |
| CN | 104563999 | A | 4/2015 |
| CN | 104564000 | A | 4/2015 |
| CN | 104612648 | A | 5/2015 |
| CN | 204402458 | U | 6/2015 |
| CN | 104763390 | A | 7/2015 |
| CN | 104874140 | A | 9/2015 |
| CN | 105327475 | A | 2/2016 |
| CN | 105344041 | A | 2/2016 |
| CN | 105536191 | A | 5/2016 |
| CN | 105641831 | A | 6/2016 |
| CN | 106581897 | A | 4/2017 |
| JP | H11239354 | A | 8/1999 |
| JP | 4866409 | B2 | 2/2012 |
| SU | 956811 | A1 | 9/1982 |
| SU | 1154485 | A1 | 5/1985 |
| SU | 1180006 | A1 | 9/1985 |
| WO | 9419059 | A1 | 9/1994 |

OTHER PUBLICATIONS

Kirzbek, A. И., et al., "Extinguish underground fire using inert fire generated by liquid nitrogen", Henan coal, Mar. 2, 1983. (4 pages).

* cited by examiner

FOAM PRODUCING METHOD, FIRE EXTINGUISHING METHOD, AND APPLIANCE FOR FOAM EXTINGUISHING

CROSS REFERENCE OF RELATED APPLICATIONS

This application is a division of U.S. patent application Ser. No. 16/490,728, filed on Sep. 3, 2019, now U.S. Pat. No. 11,559,711, entitled "FOAM PRODUCING METHOD, FIRE EXTINGUISHING METHOD, AND APPLIANCE FOR FOAM EXTINGUISHING," which in turn is a national stage application of PCT/CN2018/077196, filed on February 26, 2018, which in turn claims priority to Chinese Patent Application Publication Nos. 201710645358.3, 201710645441.0, 201710645486.8, 201710645620.4, 201710645950.3, 201710645701.4 and 201710646122.1, each filed on Aug. 1, 2017, and Chinese Patent Application No. 201710117015.X, 201710116928.X, 201710116929.4, 201710117707.4 and 201710119860.0, filed Mar. 1, 2017. The entire content of each of the prior applications is hereby incorporated by reference.

FIELD OF THE INVENTION

The present invention relates to a foam production method, and a fire extinguishing method by using the produced foam, and a foam fire-fighting equipment.

BACKGROUND

The existing compressed gas foam extinguishing methods mainly use foam produced by mixing high-pressure gas and foam solution to extinguish fire. Specific foam extinguishing methods mainly include pressure-regulated compressed gas foam extinguishing methods and gas storage foam extinguishing methods. Among those methods, the compressed gas foam extinguishing method usually employs a gas compressor, high-pressure gas pipeline network, or compressed gas cylinder for gas supply. However, the gas compressor and compressed gas cylinder have limited gas capacity, and can't meet the demand for high-flow, high-pressure, and long-time gas supply; a high-pressure gas pipeline network is unavailable at the vast majority of locations. To realize high-flow, high-pressure, and long-time gas supply, multiple compressors or compressed gas cylinders have to be provided (for example, for a foam fire engine with a flow capacity of 150 L/s, the required gas supply flow is at least 1,050 L/s, which has to be supplied by multiple large-size gas compressors), which take up too much space. Usually there is no enough space for multiple compressors or compressed gas cylinders in the tank area or equipment area in oil depots. Therefore, it is difficult to deploy those compressors or compressed gas cylinders in the field.

With respect to gas storage foam extinguishing methods, usually compressed gas is stored in a fire extinguishing agent container. The compressed gas is heavily consumed during high-flow spurting. To ensure high-pressure spurting of the fire extinguishing agent, compressed gas has to be replenished into the fire extinguishing agent container timely. However, in the high-flow spurting state, adequate replenishment of compressed gas can't be ensured merely by means of air compressors and compressed gas cylinders, and thus the requirement for high-pressure spurting can't be met effectively. The pressure in the container drops significantly as the spurting continues, and the foam performance deteriorates gradually, resulting in a compromised fire extinguishing effect. In the case of fire extinguishing against a severe fire disaster, high-flow foams must be produced for fire extinguishing. In such a case, as the flow of the foam solution is increased, the compressed gas supply has to be increased accordingly. However, high-flow and high-pressure compressed gas supply can't be realized with existing gas supply methods. For example, the maximum foam solution flow capacity of existing compressed gas foam fire engines is only 20-30 L/s, and such compressed gas foam fire engines are mainly used for suppression and extinguishing for general scale fire at present, such as building fire or small-scale ground flowing fire, but are inapplicable to fire in large-scale tank fields or large-scale ground flowing fire.

U.S. Pat. No. 5,497,833A discloses a method for improving the performance of a nozzle for guiding water flow onto a target, which comprises: injecting a liquefied gas and a composition for producing foam in effective amounts into water flowing through the nozzle at a position that is upstream enough from the outlet of the nozzle, to allow that the liquefied gas is essentially fully evaporated and solidified before leaving the nozzle. The method utilizes the driving force produced by gasification of the liquefied gas to increase the water flow velocity and increase the jetting range, and thereby improve the fire extinguishing performance. In addition, the disclosure concludes clearly that the fire extinguishing performance of carbon dioxide is better than that of liquid nitrogen.

SUMMARY

To overcome the drawbacks in existing high-pressure gas supply techniques, the present disclosure provides a novel method for producing foam, which can provide a large quantity of foams with a small-size gas supply device, and has higher fire extinguishing efficiency when applied to fire extinguishing.

To attain the above-mentioned object, in a first aspect, the present disclosure provides a method for producing foam for fire extinguishing, which comprises mixing a liquefied medium and a foam solution, and applying disturbance to strengthen the contact between the liquefied medium and the foam solution.

In a second aspect, the present disclosure provides a method for producing foam for fire extinguishing, which comprises mixing a liquefied medium, water, and a foam concentrate, and applying disturbance to strengthen the contact among the liquefied medium, the foam concentrate, and the water.

In a third aspect, the present disclosure further provides a method for extinguishing fire, which uses the above-mentioned method for producing foam to produce foams, and then uses the foam to extinguish fire.

In a fourth aspect, the present disclosure provides a foam fire-fighting equipment, which comprises a foam producing unit and a foam spurting unit, wherein, the foam producing unit comprises a mixing device having a mixing cavity and a disturbing component configured in the mixing cavity, the mixing cavity has a first inlet, a second inlet, and a first outlet, and the foam producing unit communicates with the foam spurting unit via the first outlet.

In a fifth aspect, the present disclosure provides a foam fire-fighting equipment, which comprises a foam producing unit and a foam spurting unit, wherein, the foam producing unit comprises a foam solution producing device and a mixing device, wherein the foam solution producing device comprises a mixer, the mixing device has a mixing cavity and a disturbing component configured in the mixing cavity, the mixing cavity has a first inlet, a second inlet, and a first outlet, the foam solution producing device communicates with the first inlet of the mixing device to supply foam solution into the mixing device, and the first outlet of the mixing cavity communicates with the foam spurting unit.

In a sixth aspect, the present disclosure provides a foam fire-fighting equipment, which comprises a foam producing unit and a foam spurting unit, wherein, the foam producing unit comprises a mixing device having a mixing cavity and a disturbing component configured in the mixing cavity, the mixing cavity has a second inlet, a third inlet, a fourth inlet, and a first outlet, and the foam producing unit communicates with the foam spurting unit via the first outlet.

The present disclosure pioneers t o use a method comprising mixing a gas produced by liquefied medium in situ with a foaming material intensively under the action of a disturbing component to make the foaming material produce foams, and using the foams to extinguish fire. Owing to the fact that the volume ratio of the gas produced by gasification of the liquefied medium to the liquefied medium is high, small-size gas supply devices may be used in replacement of bulky gas supply devices such as high-pressure gas cylinders, air compressors, or air compressor sets, etc. for high-flow gas supply. Thus, the sizes of gas supply devices are greatly reduced.

When the method for producing foam described above in the present disclosure is used for fire extinguishing, the fire-fighting equipment can make a quicker response, and can produce a large quantity of gas quickly within a short time. The gas supply method in the present disclosure can substitute the conventional gas supply method, such as air compressors, compressed gas cylinders, and high-pressure gas pipeline network, and can meet the requirement for high-flow high-pressure gas supply required for producing a large quantity of foams, so as to provide enough gas for high-flow gas spurting of a compressed gas foam extinguishing system or gas storage foam extinguishing system, and the technique can be applied effectively for fire extinguishing against severe fire disasters; in addition, since the gas supply method in the present disclosure can supply gas for a long time without any external mechanical power, and the foam fire-fighting equipment in the present disclosure can operate independently, too much space occupation by multiple air compressors or compressed gas cylinders required for high-flow gas spurting in the prior art can be avoided. The foam fire-fighting equipment in the present disclosure occupies less space, can be set flexibly, and is convenient for field deployment and fire extinguishing work.

DETAILED DESCRIPTION

The ends points and any value in the ranges disclosed in the present disclosure are not limited to the exact ranges or values; instead, those ranges or values shall be comprehended as encompassing values that are close to those ranges or values. For numeric ranges, the end points of the ranges and the discrete point values may be combined with each other to obtain one or more new numeric ranges, which shall be deemed as having been disclosed specifically in this document.

In the method for producing foams for fire extinguishing provided in the present disclosure, a liquefied medium and a foaming material (a foam solution formed in situ or in advance) are mixed intensively to produce foams. For the purpose of intensive mixing, disturbance is applied to the mixture of the liquefied medium and the foaming material during their contacting or after the contacting before spurting foams, to strengthen the contact between the liquefied medium and the foaming material.

In the present disclosure, the mixing is carried out under the action of disturbance. The disturbance may be applied by arranging a disturbing component, preferably arranging a disturbing component in the mixing device. A disturbing component may be arranged in the mixing device to promote extensive contact between the liquefied medium and the foaming material and intensive mixing. The disturbing component may be understood as any structures or arrangements that would influence the flow state of fluid. Any actions that alter the flow direction of foams, such as arranging protrusions on container walls, altering the shape of the mixing cavity may be referred as disturbance.

Figure 2:
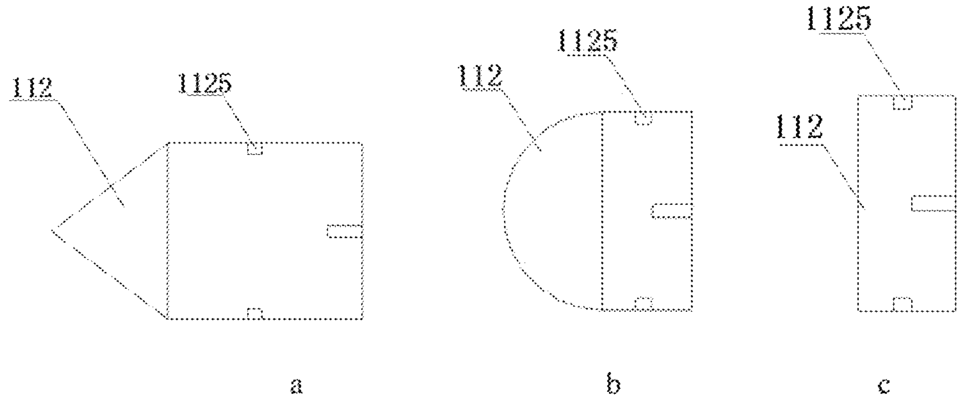
FIG. 2 is a schematic structural diagram of the disturbing component.

The disturbing component may be any arrangements that can prevent direct outflow or spurting of the liquefied medium and the foaming material. For example, the disturbing component may be shaped as a baffle plate or scraper plate, or the like. Preferably, the disturbing component is shaped as a conical structure, hemispherical structure or platform structure (e.g., a, b, and c shown in FIG. 2).

To attain the above-mentioned effect more fully, in a case that the disturbing component is in a shape with two ends in different size, such as a conical structure, hemispherical structure or platform structure, preferably the end with smaller cross section faces the inlet of the liquefied medium, while the end with greater cross section faces the outlet of foams.

In the present disclosure, the liquefied medium may be any liquefied substance that can expand in volume when gasified, preferably at least one of liquid nitrogen, liquefied carbon dioxide, and liquefied inert gas. The inert gas refers to gas of a group zero element in the periodic table.

The present disclosure employs a liquefied medium as a gas source in replacement of conventional compressed air, so as to reduce the size of the gas supply device required for producing high-flow foams. For example, in the case of liquid nitrogen, liquid nitrogen can produce a gas rapidly and the gas can be mixed with the foaming material successfully to produce foams, and the expansion ratio of liquid nitrogen is usually about 700, i.e., 1 unit volume of liquid nitrogen usually can provide about 700 units of atmospheric pressure nitrogen gas. Since the volume of the nitrogen gas produced from liquid nitrogen is much higher than the volume of the liquid nitrogen while the compression ratio of conventional compressed air is not higher than 20, the volume of the gas source for obtaining the same volume of gas can be greatly reduced. Therefore, liquid nitrogen can be directly used as a gas source and mixed with the foaming material to produce foams, rather than gasifying the liquid nitrogen outside the foaming device first and then feeding the obtained nitrogen gas into the foaming device to mix with the foaming material as the case in the prior art, and thus it greatly reduces the volume of the device, improves the flexibility of the device, and expands application field of the device.

In the present disclosure, since the volume ratio of the gas produced from liquid nitrogen to the liquid nitrogen (i.e., expansion ratio) is up to 700 or above, so using liquid nitrogen in replacement of conventional compressed air as a gas source, greatly reduces the volume of the gas source, and thereby reduces the volume of the mixing device. In contrast, the compression ratio of compressed air for existing compressed air foaming systems is usually less than 20.

Since liquid nitrogen is usually gasified into nitrogen gas at room temperature, the gas can be obtained without any additional operation.

Here, for example in the case of fire extinguishing against a fire disaster of an entire 100,000 $m^3$ storage tank, negative pressure foaming system (suction foaming system), compressed gas foaming system with gas supply from liquid nitrogen, and compressed air foaming system with air supply from compressor sets are compared and analyzed (1) As to a negative pressure foam extinguishing system, based on fire extinguishing cases in foreign countries, the "Report on Discussion in Disaster Prevention System Review Meeting of Petroleum Complexes" in Japan, codes and standards of international authorities such as API and LASTFIRE, etc., and recommended values from tank fire disaster research organizations, for fire extinguishing against a fire disaster in an entire 100,000 $m^3$ storage tank field, the required supply intensity of foam solution is at least 9 L/min.$m^2$, the required flow of the foam solution is at least 45,216 L/min., and the required time for fire extinguishing is at least 60 min, all of which are minimum values; then, the consumption of the foam solution is 2,712 $m^3$.

(2) As to a compressed air foam extinguishing system with gas supply from compressors, usually it is believed that the required foam supply intensity of the compressed air foam extinguishing system is ¼ of that of a negative pressure foam extinguishing system. However, in view of the large area of the fire disaster in an entire 100,000 $m^3$ storage tank field, according to the experimental data of large-scale pool fire extinguishing experiments carried out by the inventor of the present disclosure, the proper foam supply intensity is 5.4 L/min.$m^2$, and the flow of the foam solution is 27,130 L/min. Based on foaming ratio of 7, the air supply flow shall be at least 190 $m^3$/min., and in consideration of the loss, the required air supply flow is be not lower than 200 $m^3$/min. Based on the air supply capacity of a large-size air compressor sets at present (20-28 $m^3$/min.), 7-10 large-size air compressors are required to operate in parallel to supply air; based on about 5-6 $m^2$ floor space for each air compressor, the total floor space required for the air compressor sets is 35-70 $m^2$. The fire extinguishing time is 60 min., and the consumption of the foam solution is 1,627 $m^3$. Wherein, the large-scale pool fire extinguishing experiment refers to igniting diesel oil in an oil pool with a diameter of 21 m to form fire in the entire area, and then spurting foams into the oil pool with a foam extinguishing apparatus to carry out fire extinguishing test.

(3) As to a compressed gas foam extinguishing system with gas supply from liquid nitrogen, the foam supply intensity is also 5.4 L/min.$m^2$, and the flow of the foam solution is 27,130 L/min. Based on foaming ratio of 7, the air supply flow shall be at least 190 $m^3$/min., and in consideration of the loss, the required air supply flow is be not lower than 200 $m^3$/min. The volume of gas supply in 60 min. is 12,000 $m^3$, the volume of nitrogen gas produced by gasification of liquid nitrogen is 710 times of the volume of the liquid nitrogen, therefore, the required volume of liquid nitrogen is 17 $m^3$. The actual fire extinguishing time is 60 min., and the consumption of the foam solution is 1,627 $m^3$. The capacity of a liquid nitrogen tank truck is usually 25 $m^3$, and the floor space is about 10 $m^2$. After fully loaded with liquid nitrogen, the liquid nitrogen tank truck can supply nitrogen gas continuously for 88 min. The specific comparison is shown in the following Table 1.

TABLE 1

| Gas supply scheme | Supply time/ 60 min | Consumption of foam solution/ $m^3$ | Quantity of gas supply devices | Floor space of gas supply devices | Level of field deployment difficulty |
|---|---|---|---|---|---|
| Suction foaming | 60 min | 2,712 | None | None | The foam concentrate transporter and remote water supply device is connected to the foam fire monitor, and the required floor space is small. |
| Gas supply from compressor | 60 min | 1,627 | 7-10 sets | 35-70 $m^2$ | 1. Usually it is unable to deploy so many air compressors in the field, and the gas pipelines are complex; 2. The gas pipelines also occupy the floor space of the site, and 7-10 high-pressure gas pipelines will |

TABLE 1-continued

| Gas supply scheme | Supply time/ 60 min | Consumption of foam solution/ $m^3$ | Quantity of gas supply devices | Floor space of gas supply devices | Level of field deployment difficulty |
|---|---|---|---|---|---|
| | | | | | have severe impact on the access of fire engines and staff Therefore, the field application value is very low, though it is feasible theoretically. |
| Gas supply from liquid nitrogen | 60 min | 1,627 | 1 set | 10 $m^2$ | 1. It is convenient for the field deployment, since only one liquid nitrogen tank truck and only one liquid nitrogen pipeline are required. 2. The actual available gas supply time is 88 min 3. Since nitrogen gas is used for foaming, the nitrogen gas released when the foam is broken is also helpful for fire extinguishing; thus, double fire extinguishing effects are obtained, superior to the effect of the compressed air foaming system. |

It is seen from the above comparison: the method with the gas supply from liquid nitrogen in the present disclosure greatly reduces the floor space required for the gas supply device, reduces the difficulty in the gas supply, makes large-area fire extinguishing possible.

According to the present disclosure, different from the prior art which produces a gas externally in advance first and then mixes the gas with the foaming material, apparently the above-mentioned method can be used solely to reduce the volume of the foaming device. For example, one part of gas may be provided with the method in the prior art, while the other part of gas may be provided with the method for producing instant foams according to the present disclosure. Therefore, in the present disclosure, a part of gas may be produced outside the foaming device in advance first, and then mixed with the foaming material; alternatively, all gas may be produced with the method for producing instant foams. That is to say, the gas for foaming in the present disclosure may be provided partially with the method in the prior art, while the other part of gas may be provided by in-situ gasification of liquid nitrogen; alternatively, all gas may be provided by in-situ gasification of liquid nitrogen. To give fully play to the advantage of reducing the volume of the gas supply device as far as possible, at least 20 vol % gas, preferably at least 60 vol % gas, more preferably 100 vol % gas is produced instantly by gasification of liquid nitrogen. In other words, in the present disclosure, said “at least partially” refers to at least 20 vol %, such as 25 vol %, 30 vol %, 35 vol %, 40 vol %, 45 vol %, 50 vol %, 55 vol %, 60 vol %, 65 vol %, 70 vol %, 75 vol %, 80 vol %, 85 vol %, 90 vol %, 95 vol %, or 100 vol %.

That is to say, in the present disclosure, the liquefied medium and the foaming material may be mixed by making the liquefied medium and the foaming material direct contact with each other in the form of liquid flow respectively, or by making partially or fully gasified liquefied medium and the foaming material contact with each other in the form of liquid flow respectively. Preferably, within 10 min after gasified, preferably within 60 s, more preferably within 20 s, further preferably within 10 s, mix the liquefied medium with the foaming material.

There is no particular restriction on the conditions of the mixing. In other words, the mixing may be carried out at normal environmental temperature. Preferably, the mixing may be performed under conditions including: a mixing temperature of −10° C.~60° C. That is to say, the liquefied medium may be mixed with the foaming material at temperature of −10° C.~60° C. The mixing of the liquefied medium with the foaming material consists of two stages: a first stage under the disturbance of a disturbing component in the mixing device, and a second stage, after outputted from the mixing device and before spurted from a jetting gun. Preferably, the duration of the first stage is 1-5 s, more preferably is 1-3 s, such as 1.2 s, 1.4 s, 1.5 s, 1.6 s, 1.7 s, 1.8 s, 1.9 s, 2.0 s, 2.1 s, 2.2 s, 2.3 s, 2.4 s, 2.5 s, 2.6 s, 2.7 s, 2.8 s, or 2.9 s. The duration of the second stage depends on the jetting velocity and the pipe length of the jetting gun (distance between the foam outlet and the jetting nozzle of the jetting gun). For extinguishing equipment for large-size fire, the duration of the second stage usually is 6-40 s, preferably is 10-20 s, such as 11 s, 12 s, 13 s, 14 s, 15 s, 16 s, 17 s, 18 s, 19 s, or 19.5 s. In the present disclosure, the duration of the first stage refers to a time period from the time when the last one of the liquefied medium and the foam solution, or the last one of the liquefied medium, the water, and the foam solution enters the mixing cavity to the time when exiting the mixing cavity, and the duration of the second stage refers to a time period from leaving the mixing cavity to spurting from the fire-fighting equipment.

Preferably, the liquefied medium is mixed with the foam solution of the foaming material at 1 MPa or higher pressure, preferably at 1-2 MPa pressure; the foaming material is mixed with the liquefied medium at 0.8 MPa or higher pressure, preferably at 0.8-1.5 MPa pressure.

In the present disclosure, in order to obtain high-quality fire extinguishing foams, the liquefied medium and the foaming material must be mixed intensively.

According to an embodiment of the present disclosure, the method for producing foams comprises feeding the liquefied medium and the foam solution into the mixing device and mixing them directly to produce foams, wherein a disturbing component is configured in the mixing device.

According to test results in experiments, compressed gas foams with better quality can be obtained if the volume ratio of the foam solution to the liquid nitrogen is within a range of 80-160:1. Preferably, the volume ratio of the foam solution to the liquid nitrogen is 90-130:1, such as 91:1, 95:1, 96:1, 98:1, 100:1, 102:1, 105:1, 106:1, 108:1, 110:1, 103:1, 105:1, 110:1, 112:1, 114:1, 115:1, 117:1, 119:1, 120:1, 122:1, 124:1, 126:1, or 128:1. Said better quality of compressed gas foams refers to that the foams last longer, and that less foams are likely to burst, thus attaining a better fire extinguishing effect.

The inventor of the present disclosure has found that excellent compressed gas foams can be obtained when the foaming material is in the form of foam solution and the flow of the liquid nitrogen and the flow of the foaming material meets the following equation: $Q=mV/nf$, where Q is the volumetric flow of the liquid nitrogen, m is a preset foaming ratio usually in a range of 5-200, preferably in a range of 5-20, more preferably in a range of 6-8, V is the volumetric flow of the foaming material, n is the volumetric expansion ratio of the liquid nitrogen, and f is a pipeline loss factor in a range of 1-1.4. The volumetric flow V of the foaming material is determined according to the fire area as per "Code of Design for Foam Extinguishing System" (GB50151-2010). The volumetric expansion ratio n of liquid nitrogen refers to the ratio of volume of expanded nitrogen gas to the volume of the liquid nitrogen before expansion.

When liquid nitrogen is used as the gas source and a foam solution is used as the foaming material, the foam solution is main normal temperature fluid. After mixed with the liquid nitrogen, the foam solution can exchange heat with the liquid nitrogen extensively, and the liquid nitrogen is gasified rapidly in the fluid of the foam solution and immediately participates in the foaming. After the liquid nitrogen is gasified, because of high flow, the temperature of the foam solution drops a little, which can be neglected, and it has little influence on the quality of the foams. Even if a small amount of ice slags are produced in the foam solution when the liquid nitrogen initially contacts with the foam solution, the volume and quantity of the ice slags can be reduced to a very low level as long as the liquid nitrogen and the mixed foam solution can be dispersed effectively and quickly in the mixing device; in addition, in the subsequent flow process, those ice slags will melt away quickly and have no adverse effect on the foaming and foam spurting.

The foam solution may be commercially available or prepared in advance by mixing a foam concentrate with water. According to an embodiment of the present disclosure, the foam solution is obtained by mixing a foam concentrate with water, and the volume ratio of the foam concentrate to the water is 1-10:50-300, preferably 3-7:80-160.

According to an embodiment of the present disclosure, the method for producing foams comprises directly mixing the liquefied medium with the foam solution intensively and then gasifying to produce foams, and the mixing is carried out under a stirring condition. Disturbance is applied to the mixture by stirring, to strengthen the contact between the liquefied medium and the foam solution.

Figure 1:
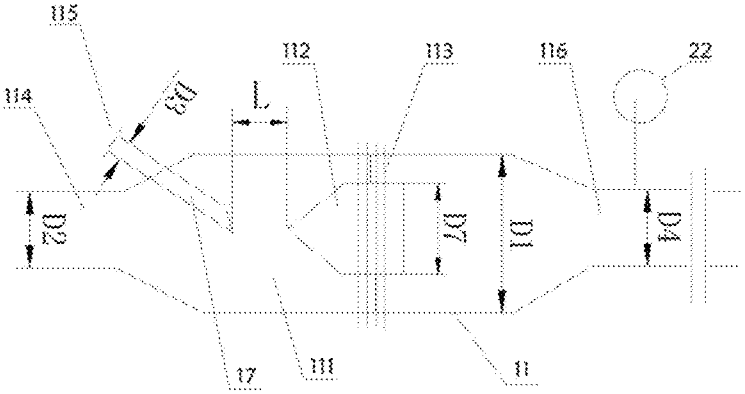
FIG. 1 is a schematic structural diagram of the foam mixing device used in an embodiment of the present disclosure.

In that embodiment, the mixing may be carried out in a mixing device 11 as shown in FIG. 1. The mixing device 11 has a mixing cavity 111, the disturbing component 112 is configured in the mixing cavity 111, the mixing cavity 111 has a first inlet 114, a second inlet 115, and a first outlet 116, the foam solution and the liquefied medium are feed into the mixing cavity via the first inlet 114 and second inlet 115 respectively, mixed in the mixing cavity, and gasified to produce foams, and the obtained foams are outputted via the first outlet 116 for fire extinguishing.

In the present disclosure, the place where the foam solution and the liquefied medium contact with each other is referred as a mixing cavity. The entire internal space from the position where the foam solution and the liquefied medium begin to contact with each other to the position where the foams are spurted out may be referred as the mixing cavity. The mixing cavity may be in different shapes, such as cylindrical cavity or tubular cavity, etc. The disturbance may exist at any position or all positions in the mixing cavity. The disturbance may be realized by arranging a disturbing component, or may be realized by charging a gas into the mixing cavity. Any other method that can realize flow disturbance shall be deemed as falling in the scope of the present disclosure.

In the present disclosure, the opening through which the foaming material (e.g., foam solution) is inputted into the mixing cavity 111 is referred as a first inlet, the opening through which the liquefied medium is inputted into the mixing cavity 111 is referred as a second inlet, the opening through which the foam concentrate is inputted into the mixing cavity 111 is referred as a third inlet, the opening through which the water is supplied into the mixing cavity 111 is referred as a fourth inlet, and the opening through which the foams flow out of the mixing cavity is referred as a first outlet, wherein the "first", "second", "third", and "fourth" are used here only for a differentiation purpose in the description, and don't represent any precedence or quantity. The openings may consist of one opening or multiple openings respectively. In the case that any opening consists of multiple openings, the diameter described below refers to the diameter corresponding to the total area of the multiple openings. (Note: in the mixing device, what is concerned is the flow area of each inlet, which is compared by the diameter of the inlet.)

According to an embodiment of the present disclosure, a plurality of second inlets 115 may be arranged around the first inlet 114. Preferably, the directions of the plurality of second inlets 115 deviate from the radial direction sequentially in the transverse direction, so that the liquefied medium flow inputted through the second inlets 115 can flow rotationally. Wherein, in the case that the mixing device 11 is a cylindrical structure, the direction from one end of the cylindrical structure to the other end is a longitudinal direction, and a direction perpendicular to the longitudinal direction is a transverse direction.

In addition, a plurality of first outlets 116 may be provided and configured to connect to a jetting pipeline respectively, so that the foams can be spurted in several directions from one mixing device.

The mixing cavity 111 is configured to provide a mixing space for the liquefied medium and the foam solution. Therefore, the mixing cavity 111 may be any structures and shapes, as long as the above-mentioned requirement can be met. Preferably, the mixing cavity 111 is a cylindrical structure.

Wherein, as described above, the disturbing component 112 may be understood as any structures that influence the flow state of fluid. Any actions that alter the foam flow direction such as arranging protrusions on container walls, altering the shape of the mixing cavity may be referred as disturbance. Preferably, the disturbing component 112 may be formed into a conical structure, hemispherical structure, or platform structure (as indicated by a, b, c in FIG. 2 respectively), or any other irregularly shaped structure. The conical top of the conical structure, the spherical top of the hemispherical structure, or the flat top of the platform structure faces the first inlet 114.

Preferably, the cross section of the disturbing component 112 is circular, and the relation between the diameter D7 of the disturbing component 112 and the diameter D2 of the first inlet 114 is: $D7/D2=0.6-4$, preferably $D7/D2=1.1-2$.

Preferably, the cross section of the disturbing component 112 is circular, and the relation between the diameter D7 of the disturbing component 112 and the diameter D1 of the cylindrical structure is: D1/D7=1.2-4.

By making the D7 meet the above-mentioned relation, on one hand, the mixing of the liquefied medium and the foaming material can be promoted to a great degree; on the other hand, an effect of reducing the cross section of foam spurting and thereby increasing the jetting velocity can be attained, thus reducing the adverse effect of the disturbance on the jetting velocity.

The distance L between the top of the disturbing component 112 and an outflow opening of the liquefied medium at the second inlet 115 is 0-100 mm. In the preferred embodiment, the mixture can form turbulence, and thereby the gas-liquid mixing is more intensive, thus obtaining foams with better quality.

In the case that the disturbing component 112 is a conical structure or hemispherical structure, the cross section of the disturbing component 112 is circular, and the diameter D7 of the disturbing component 112 is the diameter of each circle respectively in that case. Further preferably, the cross section of the disturbing component 112 is circular, the relation between the diameter D7 of the disturbing component and the diameter D2 of the first inlet refers to that the diameter of the maximum cross section of the disturbing component meets the above-mentioned relation; the cone angle of the conical structure preferably is 90-130°.

The disturbing component 112 may be provided with a mounting part 1125 for fixing the disturbing component 112 in the mixing cavity. The conical disturbing component 112 shown in FIG. 1 is mounted in a way that the conical top faces the first inlet 114. The liquid stream of foaming material mixed with the liquefied medium rushes to the disturbing component 112, may be broken by the disturbing component 112. And thus, the fluid is disturbed, and thereby the liquefied medium and the foaming material are mixed intensively, obtaining uniform and high-quality foams.

Of course, the disturbing component 112 may be arranged in a different way. For example, a plurality of disturbing components may be distributed at different positions in the mixing cavity; moreover, any form of disturbing component that can attain a disturbing effect on the liquid stream is permitted.

Figure 3:
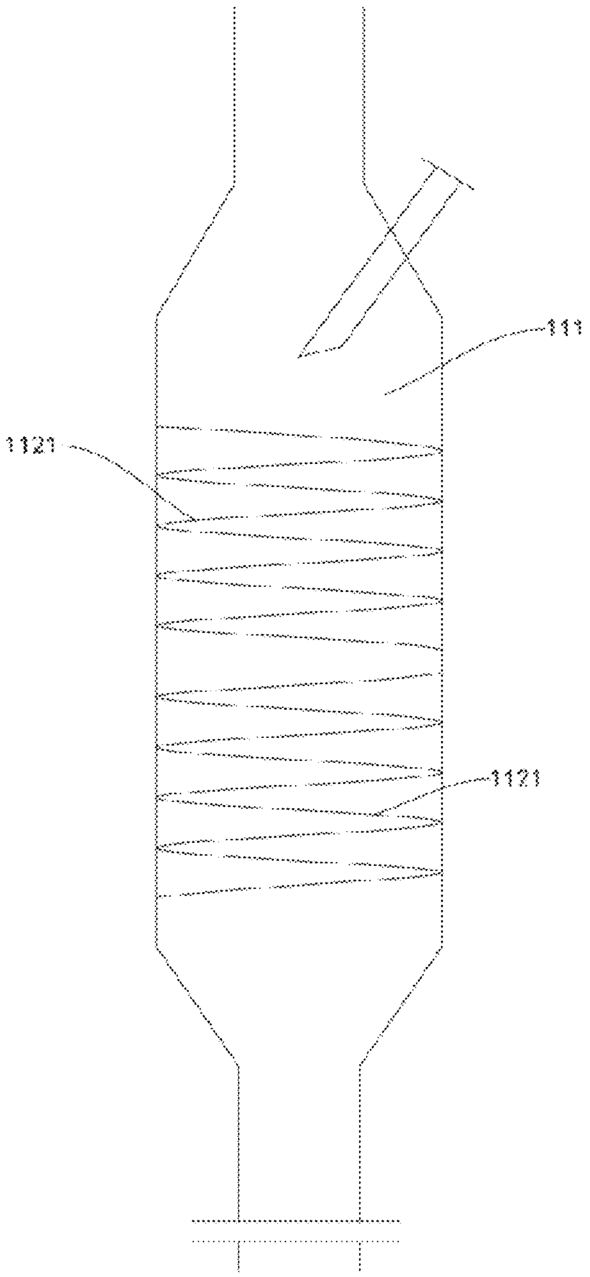
FIG. 3 is a schematic structural diagram of the disturbing component in an embodiment of the present disclosure.

As shown in FIG. 3, the disturbing component 112 may comprise a plurality of threaded sections 1121, which may be arranged on the wall surface of the mixing cavity 111 sequentially along the length direction of the mixing cavity 111, and every adjacent two threaded sections 1121 are reversed to each other in terms of the rotation direction.

When the foaming material mixed with the liquefied medium flows through one of adjacent two threaded sections 1121, the foaming material can rotate in one of clockwise direction and counter-clockwise direction under the flow guide of the threaded section 1121. When the foaming material flows through the other of the adjacent two threaded sections 1121, the foaming material can rotate in the other of clockwise direction and counter-clockwise direction under the flow guide of the threaded section 1121. Thus, the rotation direction of the foaming material can be reversed continually, and thereby the foaming material can be disturbed better and more vehemently, so that the liquefied medium and the foaming material are mixed fully, thus obtaining uniform and high-quality foams.

Preferably, the plurality of threaded sections 1121 may be connected sequentially.

Figure 4:
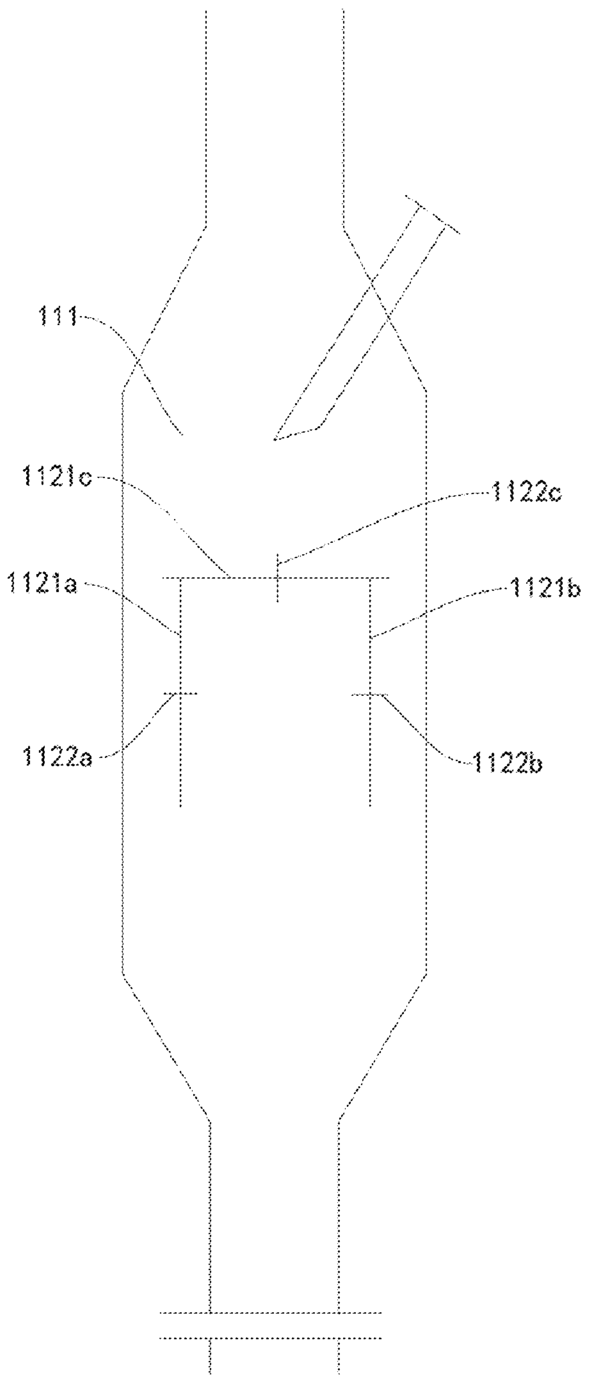
FIG. 4 is a schematic structural diagram of the disturbing component in another embodiment of the present disclosure.

As shown in FIG. 4, the disturbing component 112 may comprises a first shaft **1121*a*, a second shaft 1121*b*, and a third shaft 1121*c*. The first shaft 1121*a* may be provided with a first impeller 1122*a* and a first transmission, the second shaft 1121*b* may be provided with a second impeller 1122*b* and a second transmission. The length direction of each of the first shaft 1121*a* and the second shaft 1121*b* may be the same as the length direction of the mixing cavity 111, i.e., each of the first shaft 1121*a* and the second shaft 1121*b* may extend in the length direction of the mixing cavity 111. The rotation direction of the first shaft 1121*a* and the rotation direction of the second shaft 1121*b* may be reversed to each other, i.e., the rotation direction of the first impeller 1122*a* and the rotation direction of the second impeller 1122*b*** may be reversed to each other.

The third shaft **1121*c* may be provided with a third impeller 1122*c*, a third transmission, and a fourth transmission, the third transmission may be engaged with the first transmission, and the fourth transmission may be engaged with the second transmission. The length direction of the third shaft 1121*c* may be perpendicular to the length direction of the first shaft 1121*a*, i.e., the length direction of the third shaft 1121*c* may be perpendicular to the length direction of the mixing cavity 111**.

Since the length direction of the third shaft **1121*c* is perpendicular to the length direction of the mixing cavity 111, the length direction of the third shaft 1121*c* and the rotation axis direction of the third impeller 1122*c* may be perpendicular to the flow direction of the foaming material mixed with the liquefied medium. Thus, when the foaming material flows through the third impeller 1122*c*, drives the third impeller 1122*c* to rotate, and thereby the third impeller 1122*c* may drive the third shaft 1121*c*** to rotate.

Since the third transmission is engaged with the first transmission and the fourth transmission is engaged with the second transmission, the third shaft **1121*c* can drive the first shaft 1121*a* and the second shaft 1121*b* to rotate, and thereby the first shaft 1121*a* can drive the first impeller 1122*a* to rotate, and the second shaft 1121*b* can drive the second impeller 1122*b*** to rotate.

Since the rotation direction of the first impeller **1122*a* and the rotation direction of the second impeller 1122*b* are reversed to each other, the foaming material may be generally split by the first impeller 1122*a* and the second impeller 1122*b* into two fluid streams, which may impact each other or impact the wall surface of the mixing cavity 111** respectively. Thus, the foaming material can be disturbed better and more vehemently, so that the liquefied medium and the foaming material are mixed fully, thus obtaining uniform and high-quality foams.

Preferably, both the first transmission and the third transmission may be bevel gears, or the third transmission and the first transmission may form a worm and gear mechanism; both the second transmission and the fourth transmission may be bevel gears, or the fourth transmission and the second transmission may form a worm and gear mechanism.

Figure 5:
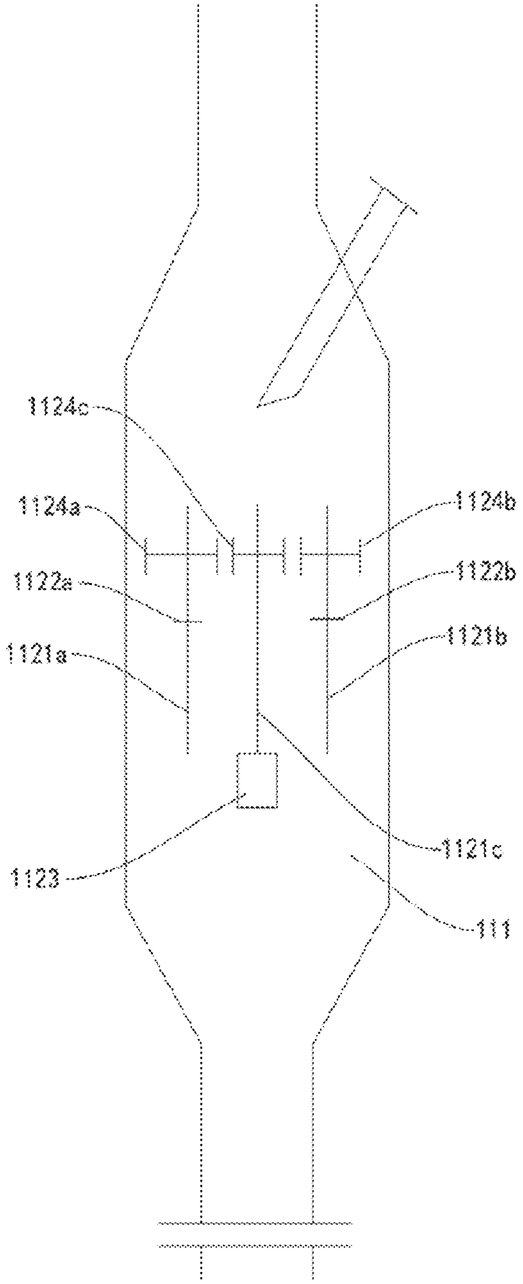
FIG. 5 is a schematic structural diagram of the disturbing component in yet another embodiment of the present disclosure.

As shown in FIG. 5, the disturbing component 112 may comprises a first shaft **1121*a*, a second shaft 1121*b*, a third shaft 1121*c*, and a motor 1123. The first shaft 1121*a* may be provided with a first impeller 1122*a* and a first transmission 1124*a*, the second shaft 1121*b* may be provided with a second impeller 1122*b* and a second transmission 1124*b*. The length direction of each of the first shaft 1121*a* and the second shaft 1121*b* may be the same as the length direction of the mixing cavity 111, i.e., each of the first shaft 1121*a* and the second shaft 1121*b* may extend in the length direction of the mixing cavity 111. The rotation direction of the first shaft 1121***a* and the rotation direction of the second shaft 1121*b* may be reversed to each other, i.e., the rotation direction of the first impeller 1122*a* and the rotation direction of the second impeller 1122*b* may be reversed to each other.

The third shaft 1121*c* may be provided with a third transmission 1124*c*, which may be engaged with each of the first transmission 1124*a* and the second transmission 1124*b*. The motor 1123 may be connected to the third shaft 1121*c* so as to drive the third shaft 1121*c* to rotate.

Since the third transmission 1124*c* is engaged with each of the first transmission 1124*a* and the second transmission 1124*b*, the third shaft 1121*c* can drive the first shaft 1121*a* and the second shaft 1121*b* to rotate, the first shaft 1121*a* can thereby drive the first impeller 1122*a* to rotate, and the second shaft 1121*b* can drive the second impeller 1122*b* to rotate.

Since the rotation direction of the first impeller 1122*a* and the rotation direction of the second impeller 1122*b* are reversed to each other, the foaming material may be generally split by the first impeller 1122*a* and the second impeller 1122*b* into two fluid streams, which may impact each other or impact the wall surface of the mixing cavity 111 respectively. Thus, the foaming material can be disturbed better and more vehemently, so that the liquefied medium and the foaming material are mixed fully, thus obtaining uniform and high-quality foams.

As shown in FIG. 5, the length direction of the third shaft 1121*c* may be the same as the length direction of the first shaft 1121*a*, i.e., the length direction of the third shaft 1121*c* may be the same as the length direction of the mixing cavity 111, and all of the first transmission 1124*a*, the second transmission 1124*b*, and the third transmission 1124*c* may be cylindrical gears.

Figure 6:
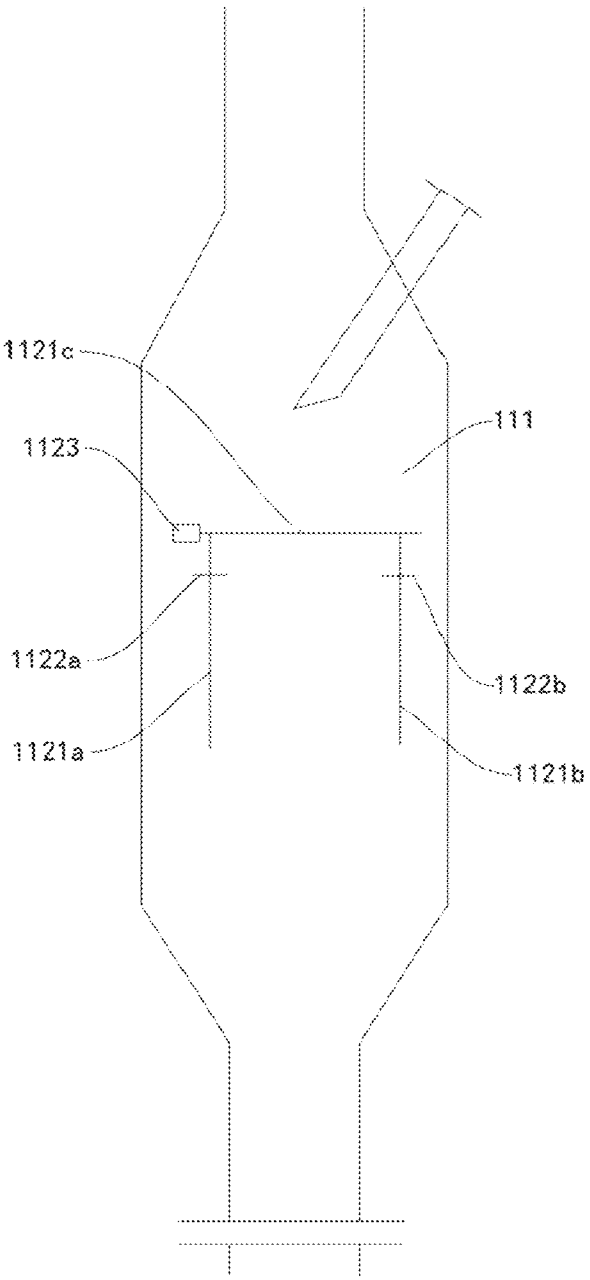
FIG. 6 is a schematic structural diagram of the disturbing component in yet another embodiment of the present disclosure.

As shown in FIG. 6, the disturbing component 112 may comprises a first shaft 1121*a*, a second shaft 1121*b*, a third shaft 1121*c*, and a motor 1123. The first shaft 1121*a* may be provided with a first impeller 1122*a* and a first transmission, the second shaft 1121*b* may be provided with a second impeller 1122*b* and a second transmission. The length direction of each of the first shaft 1121*a* and the second shaft 1121*b* may be the same as the length direction of the mixing cavity 111, i.e., each of the first shaft 1121*a* and the second shaft 1121*b* may extend in the length direction of the mixing cavity 111. The rotation direction of the first shaft 1121*a* and the rotation direction of the second shaft 1121*b* may be reversed to each other, i.e., the rotation direction of the first impeller 1122*a* and the rotation direction of the second impeller 1122*b* may be reversed to each other.

The third shaft 1121*c* may be provided with a third transmission and a fourth transmission, the third transmission may be engaged with the first transmission, and the fourth transmission may be engaged with the second transmission. The length direction of the third shaft 1121*c* may be perpendicular to the length direction of the first shaft 1121*a*, i.e., the length direction of the third shaft 1121*c* may be perpendicular to the length direction of the mixing cavity 111. The motor 1123 may be connected to the third shaft 1121*c* so as to drive the third shaft 1121*c* to rotate.

Since the third transmission is engaged with the first transmission and the fourth transmission is engaged with the second transmission, the third shaft 1121*c* can drive the first shaft 1121*a* and the second shaft 1121*b* to rotate, and the first shaft 1121*a* can in turn drive the first impeller 1122*a* to rotate, and the second shaft 1121*b* can drive the second impeller 1122*b* to rotate.

Since the rotation direction of the first impeller 1122*a* and the rotation direction of the second impeller 1122*b* are reversed to each other, the foaming material may be generally split by the first impeller 1122*a* and the second impeller 1122*b* into two fluid streams, which may impact each other or impact the wall surface of the mixing cavity 111 respectively. Thus, the foaming material can be disturbed better and more vehemently, so that the liquefied medium and the foaming material are mixed fully, thus obtaining uniform and high-quality foams.

Preferably, both the first transmission and the third transmission may be bevel gears, or the third transmission and the first transmission may form a worm and gear mechanism; both the second transmission and the fourth transmission may be bevel gears, or the fourth transmission and the second transmission may form a worm and gear mechanism.

In this embodiment, at least one porous structure 113, such as orifice plate or wire mesh, may be arranged in a spaced manner in the mixing cavity 111 of the mixing device 11, and each porous structure 113 has a plurality of pores; the pores of the porous structure 113 face the first inlet 114, and the porous structure 113 is opposite to the top of the disturbing component 112 and is away from the first inlet 114. The liquid stream broken by the disturbing component 112 rushes to the porous structure 113 from the circumference of the disturbing component 112, and may be further disturbed by the porous structure 113, so that it is further mixed.

Figure 7:
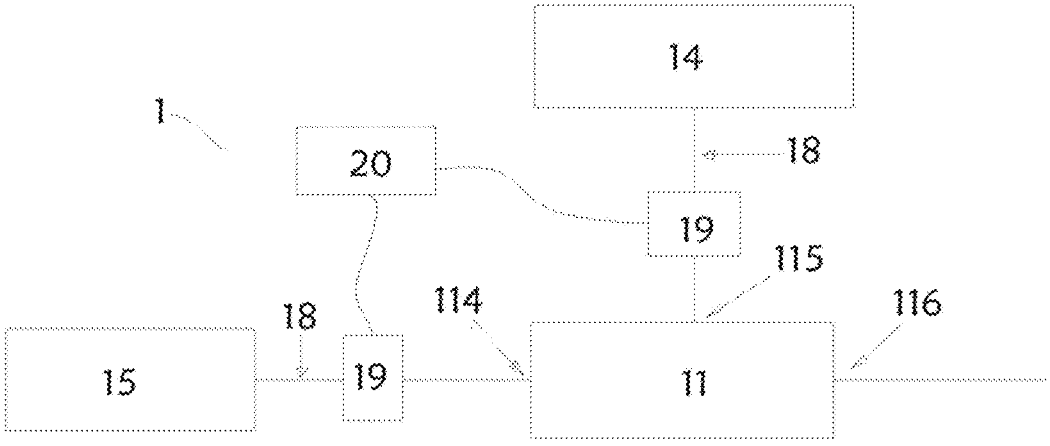
FIGS. 7 and 8 are schematic structural diagrams of the foam producing unit and foam fire-fighting equipment in an embodiment of the present disclosure.

In specific uses, as shown in FIG. 7, the first inlet 114 of the mixing device may be connected to a foam solution supply device 13 configured to store a foam solution, or may be connected to a foam solution producing device 12 configured to mix a foam concentrate with water to obtain the foaming material; the second inlet 115 may be connected to a liquefied medium supply device 14, such as liquid nitrogen cylinder, liquid nitrogen transfer pipeline network, or liquid nitrogen tank truck. The devices preferably communicate with each other via connecting pipes 18.

Preferably, a flow regulator (i.e., a control valve) 19 is provided between the mixing device 11 and the foam solution supply device 13 and between the mixing device 11 and the liquefied medium supply device 14. In addition, a pressure meter 22 may be provided at the first inlet 114, the second inlet 115 and/or the first outlet 116, so as to detect the pressure there in real time.

Preferably, the flow regulator 19 is connected to the controller 20, so as to control the flow regulator 19 via the controller 20 and thereby control the open/close of the first inlet 114 and the second inlet 115. It should be noted that the controller 20 may be provided for a trailer-type foam fire-fighting equipment, but usually is omitted for a portable fire extinguisher or wheeled fire extinguisher owing to the small size and simple structure of the fire extinguisher.

The foam solution supply device 13 may be any device that can provide foam solution in the art, such as a foam solution storage tank.

The liquefied medium supply device 14 may be any device that can provide liquefied medium in the art, such as a liquid nitrogen storage tank or liquefied carbon dioxide storage tank.

A pipe longer than 40 m may be connected to the first outlet 116 of the mixing device 11. After mixed in the mixing device, the mixture of liquefied medium and the foaming material is transferred through the pipe longer than 40 m to the jetting orifice. The liquefied medium and the foaming material are also mixed intensively and repeatedly as they flow through the pipe, and thereby form stable and high-quality foams before being spurted out.

According to an embodiment of the present disclosure, the mixing cavity is a cylindrical structure, the first inlet 114 and the second inlet 115 are located at one end of the cylindrical structure, the first outlet 116 is located at the other end of the cylindrical structure, and an angle α between the direction of the second inlet 115 and the direction of the first inlet 114 is 0-90°, preferably 30-60°. Since the second inlet 115 is angularly arranged from and the first inlet 114, cross flows are produced when the two liquids are inputted into the mixing cavity, and thereby turbulence is produced and a better mixing effect is attained.

In order to reduce pressure drop and obtain a better mixing of the foaming material and the liquefied medium, preferably the relation between the diameter D1 of the cylindrical structure and the diameter D2 of the first inlet 114 is: D1/D2=1.1-4, preferably D1/D2=2-4; the relation between the diameter D2 of the first inlet 114 and the diameter D3 of the second inlet 115 is: D2/D3=4-10; the relation between the diameter D1 of the cylindrical structure and the diameter D4 of the first outlet 116 is: D1/D4=0.8-2, preferably D1/D4=1.2-2.

In the present disclosure, flow meter, pressure meter, and control valve may be provided at the inlets and outlet respectively to control the flow ratio of the materials. That also applies in the following text.

Those skilled in the art can understand that the first inlet 114, the second inlet 115, and the first outlet 116 are not limited to the arrangements described above. Various modifications or variations may be made to attain a better mixing effect.

In order to control the flow direction of the liquefied medium entering the mixing cavity via the first inlet 114, as shown in FIG. 1, the first inlet 114 may be arranged to extend to an input pipe 17 in the mixing cavity.

Corresponding to the method for foaming, the present disclosure further provides a foam fire-fighting equipment, which, as shown in FIG. 3, foam fire-fighting equipment 100 comprises a foam producing unit 1 and a foam spurting unit 2, wherein, the foam producing unit 1 comprises a mixing device 11, which, as described above, has a mixing cavity 111 and a disturbing component 112 arranged in the mixing cavity 111, wherein the mixing cavity 111 has a first inlet 114, a second inlet 115, and a first outlet 116, and the foam producing unit 1 communicates with the foam spurting unit 2 via the first outlet 116.

As shown in FIG. 7, the foam producing unit 1 comprises a mixing device 11, a foam solution supply device 13, and a liquefied medium supply device 14. Preferably, a flow regulator 19 is provided between the mixing device 11 and the foam solution supply device 13 and between the mixing device 11 and the liquefied medium supply device 14. A flow regulator 19 may also be provided between the foam producing unit 1 and the foam spurting unit 2. In addition, a pressure meter 24 may be provided at the first inlet 114, the second inlet 115 and/or the first outlet 116, so as to detect the pressure there in real time.

Preferably, the flow regulator 19 is connected to the controller 20, so as to control the flow regulator 19 via the controller 20 and thereby control the open/close of the first inlet 114 and the second inlet 115. It should be noted that the controller 20 may be provided for a trailer-type foam fire-fighting equipment, but usually is omitted for a portable fire extinguisher or wheeled fire extinguisher owing to the small size and simple structure of the fire extinguisher.

Figure 8:
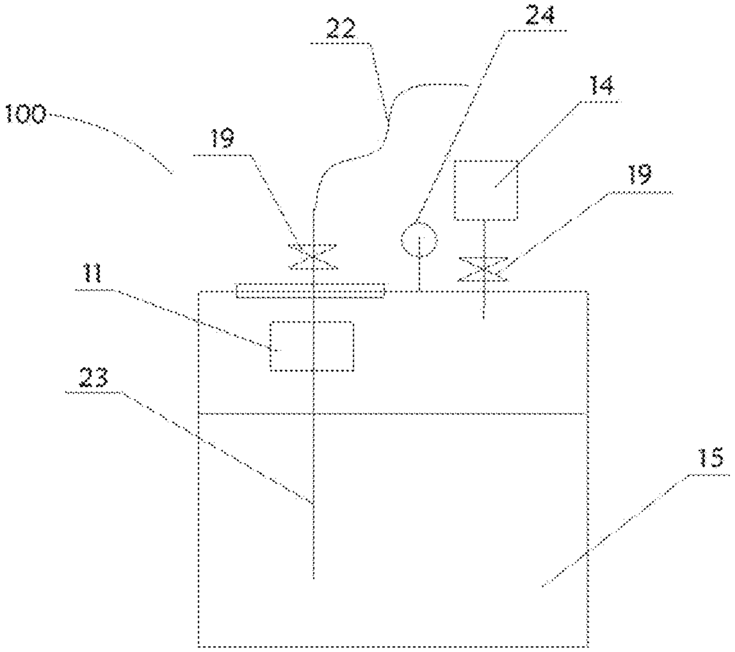

According to an embodiment of the present disclosure, the foam fire-fighting equipment 100 is a fire extinguisher. As shown in FIG. 8, the mixing device 11 and the foam solution supply device 13 are arranged in the cylinder of the foam extinguisher, the liquefied medium supply device 14 (i.e., liquid nitrogen cylinder) is arranged outside the cylinder of the foam extinguisher (of course, the liquefied medium supply device 14 may be arranged in the cylinder of the foam extinguisher alternatively), the liquid nitrogen supplied by the liquefied medium supply device 14 to the mixing device 11 is mixed with the foam solution supplied by the foam solution supply device 13 to the mixing device 11, and is gasified to produce foams, then the produced foams are spurted out from a foam jetting pipe 22.

To use the fire extinguisher, first, the foam solution is injected into the foam solution supply device 13 in the cylinder of the fire extinguisher, then the mixing device 11 is mounted in the cylinder and a suction pipe 23 is connected into the foam solution supply device 13, and the liquefied medium supply device 14 (a liquid nitrogen cylinder) filled with liquid nitrogen is mounted on the cylinder. In storage, the cylinder of the fire extinguisher is kept in a normal pressure state. To carry out fire extinguishing, first, the flow regulator 19 that controls the liquid nitrogen cylinder is opened, so that the liquid nitrogen is injected into the mixing device 11 in the cylinder of the fire extinguisher (at normal pressure) under the action of gravity and pressure; in view that the density of liquid nitrogen (0.82) is lower than the density of water, the cylinder is turned upside down for several times, so that the liquid nitrogen contacts with the foam solution in the cylinder intensively and is gasified immediately, and the pressure in the cylinder starts to rise; when the pressure in the cylinder rises to a certain pressure (indicated by a pressure meter 24 mounted on the cylinder), the flow regulator 19 on the cylinder is opened immediately, and the foam jetting pipe 22 is aligned to the root of the flames, so as to spurt foams for fire extinguishing. Since the storage temperature of liquid nitrogen is −196° C. and the temperature difference is very high, the gasification is very quick, and complete gasification can be accomplished within several seconds. Compared with existing suction-type foam extinguishers, the fire extinguisher has advantages including long jetting range, stable spurting process, and stable foam layers.

In the foam fire-fighting equipment provided in the present disclosure, the liquefied medium inputted by the liquefied medium supply device 14 into the mixing cavity is mixed with the foam solution inputted by the foam solution supply device 13, the liquefied medium exchanges heat with the foam solution and is gasified to produce foams during the mixing process. With such a foaming method, high-flow foams with a high expansion ratio can be obtained, and the obtained foams are uniform and highly stable.

Wherein, the foam spurting unit 2 may communicate with the first outlet 116 via a foam conveyor pipe 21, which may be a built-in component of the foam spurting unit or externally connected, and connects the first outlet 116 to the jetting nozzle of the foam spurting unit. For a large-size fire engine, the pipe is usually about 40 m in length. The foam solution and the liquefied medium are further mixed and produce foams in the pipe. That arrangement also applies in the following examples.

The structure and components of the mixing device have been described above, and will not be detailed further here.

Since ready-made foam solution is used directly in this embodiment, the embodiment is applicable to locations where fire water supply is inconvenient and the fire area is small. In use, the liquefied medium and the foam solution are directly fed into the mixing device and mixed intensively to produce foams under the disturbance of the disturbing component 112, and then the foams enter the foam spurting unit 2 via the first outlet 116 and are spurted from the jetting nozzle for fire extinguishing.

The foam spurting unit of the foam fire-fighting equipment may be a mobile fire monitor, foam gun, water monitor, or fixed foam generator, etc., for example. The foam fire-fighting equipment may be a portable fire extinguisher, wheeled fire extinguisher, or skid-mounted fire extinguisher, etc., for example.

The foam fire-fighting equipment described above avoids the technical route of air supply with air compressors or blowers, etc., and avoids the technical route of heat exchanging and gasification of a liquefied medium (e.g., liquid nitrogen) in a gasifier for producing a large quantity of compressed gas, and thereby eliminates bulky compressors or compressed gas cylinders, or bulky and complex liquefied gas gasifier, etc. The foam fire-fighting equipment in this embodiment is compact and space-saving, especially suitable for use in small-size mobile fire extinguishing apparatuses, such as portable fire extinguishers, trailer-type fire extinguishers, or wheeled fire extinguishers, etc. Mobile foam extinguishing apparatuses that utilize the foam fire-fighting equipment in the present disclosure as a module are small in size. Among those mobile foam extinguishing apparatuses, trailer-type fire extinguishers are larger ones, and are characterized in that a liquid nitrogen storage cylinder (only several liters in volume) is used in replacement of high-pressure gas storage spaces or devices such as air compressors or blowers, and thereby the volume of the entire apparatus is reduced, the apparatus is more flexible to use, and is stored at normal pressure before it is used. In use, the liquid nitrogen is released from the cylinder to form high-pressure nitrogen gas, which participates in the follow-up mixing and foaming process.

According to another embodiment of the present disclosure, the foaming material is a foam solution that is formed by mixing a foam concentrate with water in advance; then the foam solution is mixed with the liquefied medium in the mixing device, and a disturbing component is provided in the mixing device. Preferably, the volume ratio of the liquefied medium to the foam concentrate to the water is 1:1-10:50-300, preferably 1:3-7:80-160. For example, the volume ratio of the liquefied medium to the foam concentrate is 1:3, 1:4, 1:5, 1:6, or 1:7, and the volume ratio of the liquefied medium to the water is 1:82, 1:85, 1:86, 1:88, 1:89, 1:100, 1:105, 1:108, 1:110, 1:115, 1:120, 1:125, 1:130, 1:135, 1:140, 1:145, 1:150, 1:152, 1:155, 1:158, or 1:160.

Wherein, the foam concentrate may be one or more of protein foam concentrate, fluoroprotein foam liquid concentrate, aqueous film-forming foam concentrate, water base foam concentrate, alcohol-resistant fluoroprotein foam concentrate, and alcohol-resistant aqueous film-forming foam concentrate, and usually contains additives such as surfactants and stabilizers. All of those materials are commercially available.

The mixing device used in this embodiment may be the mixing device used in the above-mentioned examples.

In the present disclosure, the place where the foam concentrate is mixed with water to form the foam solution is referred as a mixed solution producing device, which may be any kinds of mixer. The structure of the mixer may be determined according to the mixing device described above. Since foaming is not required during the foam concentrate forming process, a disturbing component may be provided or not in the mixing device that is used as the mixer.

Corresponding to that embodiment, the present disclosure provides a foam fire-fighting equipment, which comprises a foam producing unit and a foam spurting unit, wherein, the foam producing unit comprises a mixing device and a foam solution producing device, wherein the mixing device has a mixing cavity and a disturbing component arranged in the mixing cavity, the mixing cavity has a foam solution inlet for a foam solution to flow into the mixing cavity, a liquefied medium inlet for a liquefied medium to flow into the mixing cavity, and a foam outlet for discharging foams from the mixing cavity into the foam spurting unit, the foam solution producing device communicates with the foam solution inlet of the mixing device to supply the foam solution into the mixing device, and the foam outlet of the mixing cavity communicates with the foam spurting unit.

Figure 9:
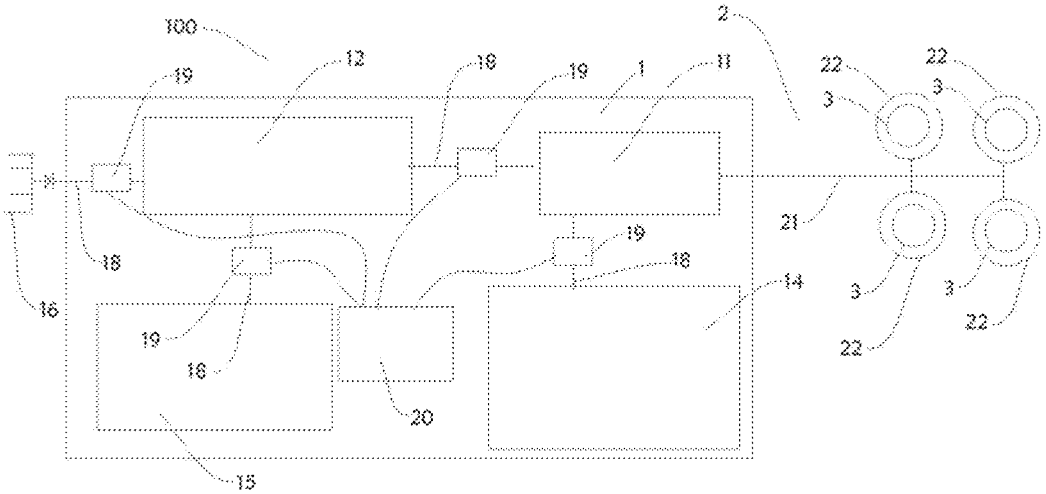
FIGS. 9 and 10 are schematic structural diagrams of the foam producing unit and foam fire-fighting equipment in another embodiment of the present disclosure.

According to an embodiment of the present disclosure, as shown in FIG. 9, the appliance 100 comprises a foam producing unit 1 and a foam spurting unit 2, wherein, the foam producing unit 1 comprises a mixing device 11 and a foam solution producing device 12, the foam solution producing device 12 supplies a foam solution into the mixing device 11, and the foams produced in the mixing device 11 is supplied to the foam spurting unit 2. The structure of the mixing device 1 may be the structure described above.

In use, first, the foam concentrate and fire water are inputted via respective inlets into the foam solution producing device 12 and mixed to obtain a foam solution, then the foam solution is inputted via the mixed solution outlet into the mixing device 11 and is mixed intensively with the liquefied medium under the disturbance of the disturbing component 112 to produce foams, the obtained foams are outputted to the foam spurting unit 2 and spurted out for fire extinguishing.

The structure of the mixing device 11 has been described above, and will not be further detailed here.

Preferably, the mixing cavity is a cylindrical structure, and the relation between the diameter D1 of the cylindrical structure and the diameter D2 of the first inlet 114 is: D1/D2=1.1-4, preferably D1/D2=1.4-2; the relation between the diameter D2 of the first inlet 114 and the diameter D3 of the second inlet 115 is: D2/D3=10-15; the relation between the diameter D1 of the cylindrical structure and the diameter D4 of the first outlet 116 is: D1/D4=0.8-2, preferably D1/D4=1.2-1.4.

There is no particular restriction on the structure of the foam solution producing device 12, as long as the foam concentrate and the fire water can be mixed intensively in the foam solution producing device to form the foam solution. Specifically the above-mentioned mixing device with or without the disturbing component may be used.

Preferably, the mixing device 11 is integrated with the foam solution producing device 12. As shown in FIG. 6, the foam solution producing device 12 is a pipe arranged at the end where the first inlet 114 of the mixing device 11 is located as shown in FIG. 1, and no disturbing component is provided in the pipe. In that case, the first inlet 114 and the foam solution outlet of the foam solution producing device 12 are the same opening. Further preferably, the diameter D2 of the first inlet 114 is equal to the diameter D6 of the fourth inlet 118.

Figure 10:
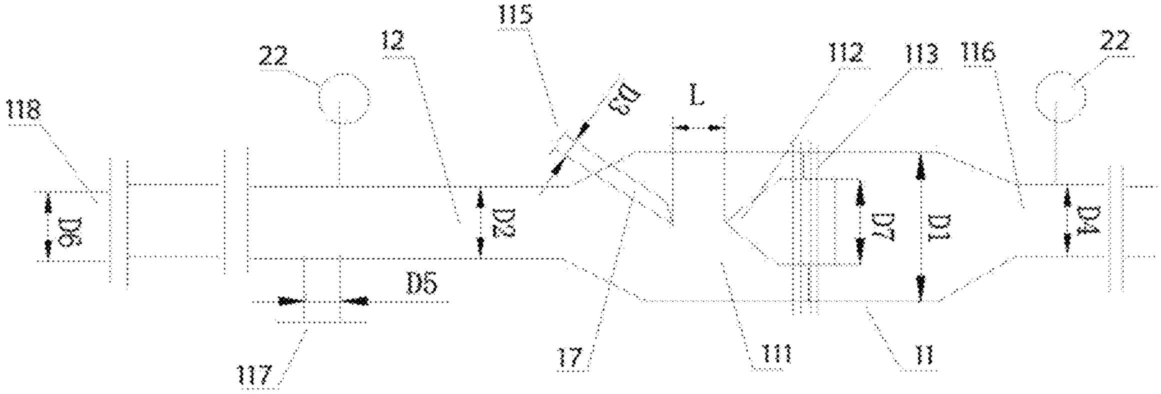

As shown in FIG. 10, the foam solution producing device 12 is arranged in front of the feed ports of the mixing device 11, and the foam solution producing device 12 comprises a foam concentrate inlet (the third inlet) 117 and a water inlet (the fourth inlet) 118. After the foam concentrate and water are mixed in the pipe to form the foam solution, the foam solution and the liquefied medium inputted via the second inlet 115 are fed together into the mixing cavity of the mixing device 11, and are mixed to produce foams under the disturbance of the disturbing component 112, and the obtained foams are outputted via the first outlet 116.

To obtain a foam solution at appropriate concentration, the flow of the foam concentrate and water fed to the raw solution mixer (i.e., the mixed solution producing device) must be controlled, for example, flow regulators 19 may be provided at the inlets to attain the control purpose. Furthermore, the inlets are controlled by means of the controller 20.

In this embodiment, preferably, the ratio of the diameter D6 of the fourth inlet (the water inlet) of the foam solution producing device 12 to the diameter D5 of the third inlet (the foam concentrate inlet) is 8-14.

The ratio of the diameter D3 of the second inlet to the diameter D5 of the third inlet preferably is 1-1.4.

Preferably, the fire extinguishing equipment 100 further comprises a foam concentrate supply device 6 that communicates with the foam concentrate inlet to supply the foam concentrate into the mixer and/or a liquefied medium supply device 14 that communicates with the second inlet 115 to supply the liquefied medium into the mixing cavity, wherein the water inlet is configured to communicate with a water supply device (e.g., a fire water source) 5.

In an embodiment, as shown in FIG. 9, the foam producing unit 1 comprises a mixing device 11, a foam solution producing device 12, a liquefied medium supply device 14 (e.g., a liquid nitrogen cylinder), and a foam concentrate supply device 15 (e.g., a foam concentrate supply tank), wherein, the foam solution producing device 12 is connected to a fire water source (a water supply device) 16 and a foam concentrate device 15, and the mixing device 11 is connected to the foam solution producing device 12 and the liquefied medium supply device 14, so as to input foam solution and liquid nitrogen into the mixing device 11.

The third inlet 21 of the mixed solution producing device for inputting foam concentrate communicates with the foam concentrate supply device 15, the water inlet of the foam solution producing device (i.e., the fourth inlet 22) communicates with the water supply device 16, and the outlet of the foam solution producing device 12 communicates with the mixing device 11. The foam concentrate supplied via the third inlet 21 and the water supplied via the fourth inlet 22 enter the foam solution producing device 12 and are mixed to produce a foam solution, and the foam solution is outputted to the mixing device 11.

Preferably, as shown in FIG. 9, the foam fire-fighting equipment further comprises a plurality of connecting pipes 18 and a plurality of flow regulators 19, which are respectively used to connect the material supply devices with the mixing device or jetting pipe and carry out flow control.

As shown in FIG. 9, the connecting pipes are referred as first connecting pipe, second connecting pipe, third connecting pipe, and fourth connecting pipe respectively. Wherein, a first end of the first connecting pipe is connected to the outlet of the foam concentrate supply device 15, and a second end of the first connecting pipe is connected to the foam concentrate inlet 21 of the mixed solution producing device 12. A first end of the second connecting pipe is connected to the water supply device 16, and a second end of the second connecting pipe is connected to the water inlet 22 of the mixed solution producing device 12.

A first end of the third connecting pipe is connected to the outlet of the mixed solution producing device 12, and a second end of the third connecting pipe is connected to the foam solution inlet of the mixing device 11. A first end of the fourth connecting pipe is connected to the outlet of the liquid nitrogen cylinder 14, and a second end of the fourth connecting pipe is connected to the liquefied medium inlet 115 of the mixing device 11.

A first flow regulator is provided on the first connecting pipe, a second flow regulator is provided on the second connecting pipe, a third flow regulator is provided on the third connecting pipe, and a fourth flow regulator is provided on the fourth connecting pipe.

The controller 20 is connected with the first flow regulator to control the flow of the foam concentrate in the first connecting pipe, connected with the second flow regulator to control the flow of the water in the second connecting pipe, connected with the third flow regulator to control the flow of the foam solution in the third connecting pipe, and is connected with the fourth flow regulator to control the flow of the liquid nitrogen in the fourth connecting pipe. Thus, a better foaming effect can be attained, and the quality of the foams can be improved.

Preferably, each of the first flow regulator, the second flow regulator, the third flow regulator, and the fourth flow regulator may comprise a flow meter and a flow control valve. Each of the flow meters and the flow control valves may be arranged on corresponding one of the first connecting pipe, the second connecting pipe, the third connecting pipe, and the fourth connecting pipe. For example, the flow meter and flow control valve of the first flow regulator may be arranged on the first connecting pipe.

The controller 20 may be connected with each of the flow meter and the flow control valve so as to control the opening of the flow control valve according to the detected value of the flow meter and thereby control the flow of the fluid in the pipe.

In an embodiment, as shown in FIG. 9, the foam fire-fighting equipment 100 may further comprise a foam spurting unit 2, which has a foam conveyor pipe and a foam jetting pipe, wherein a foam inlet of the foam conveyor pipe communicates with the foam outlet of the mixing device 11 so that the foams supplied by the mixing device 11 enter the foam spurting unit 2, and an outlet of the foam conveyor pipe communicates with an inlet of the foam jetting pipe so that the foam spurting unit 2 can spurt the foams onto target objects. With the foam spurting unit 2, the foams can be spurted to target objects more conveniently and accurately.

In an embodiment, the foam spurting unit 2 may comprise a lifting jet fire fighting truck having a telescopic arm, and a flexible foam conveyor pipe. A first port of the foam conveyor pipe is a foam inlet, a second port of the foam conveyor pipe is a foam jetting orifice, and the portion of the foam conveyor pipe adjacent to the second port is arranged on the telescopic arm.

By extending the telescopic arm, the second port of the foam conveyor pipe gets closer to the target objects (e.g., a flaming point), i.e., the foam jetting orifice gets closer to the target objects, and thereby can spurt the foams onto the target objects more efficiently, so as to realize accurate spurting and reduce foam loss and improve fire extinguishing efficiency. By configuring the foam conveyor pipe to be flexible, the foam conveyor pipe can be extended and retracted more easily along with the telescopic arm.

In an embodiment, the foam spurting unit 2 may comprises a fire fighting robot and a flexible foam conveyor pipe. The fire-fighting robot has a foam inlet and a foam jetting orifice, a first end of the foam conveyor pipe is connected to the foam outlet, and a second end of the foam conveyor pipe is connected to the foam inlet.

When spurting foams onto target objects, the fire-fighting robot can move to a position near the target objects, and thereby can spurt the foams onto the target objects more efficiently, so as to realize accurate spurting, reduce foam loss, and improve fire extinguishing efficiency. By configuring the foam conveyor pipe to be flexible, the foam conveyor pipe can move along with the movement of the fire-fighting robot. The foam fire-fighting equipment 100 including the foam spurting unit 2 may be used for fire extinguishing against ground-flowing fire.

In an embodiment, the foam spurting unit 2 may comprise a foam conveyor pipe 21 and an annular foam jetting pipe 22. The foam jetting pipe 22 is adapted to be arranged around a combustible material storage tank 3 (e.g., a large-size oil storage tank), i.e., the foam jetting pipe 22 is arranged around the combustible material storage tank 3 when it is in an operational state. In other words, the foam jetting pipe 22 may be circular or elliptical.

The foam jetting pipe 22 is provided with a plurality of foam jetting orifices spaced in the circumferential direction of the foam jetting pipe 22. A first end of the foam conveyor pipe 21 is connected to the foam outlet, and a second end of the foam conveyor pipe 21 is connected to the foam jetting pipe 22, i.e., the first end of the foam jetting pipe 22 may be the foam inlet. The foam fire-fighting equipment 100 including the foam spurting unit 2 may be used for fire extinguishing in oil product depots and medium-size oil tank fields.

This embodiment is applicable to occasions where foam concentrate and water are conveniently supplied. Or the foam concentrate may be carried by the fire engine, and the water may be supplied from a fire water pump at the fire location.

The foam spurting unit of the foam fire-fighting equipment may be a high-spraying fire engine or foam fire engine, etc., for example.

According to another embodiment of the present disclosure, the foaming material is a foam concentrate, and the method for producing foams comprises mixing the foam concentrate, a liquefied medium, and water, and applying disturbance to strengthen the contact among the liquefied medium, the foam concentrate, and the water.

According to an embodiment of the present disclosure, the mixing is carried out in a mixing device, and applying the disturbance comprises arranging a disturbing component in the mixing device.

Figure 12:
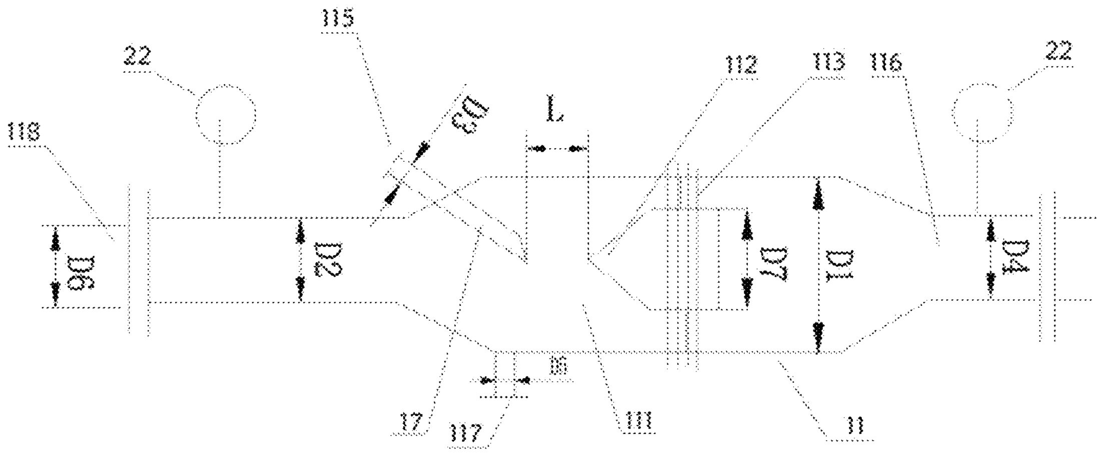

Since the embodiment integrates the formation process of the foam solution with the foaming process, an inlet may be added on the basis of the mixing device described above to supply the fire water into the mixing device. Specifically, as shown in FIG. 12, the mixing device 11 has a mixing cavity 111, the disturbing component 112 is arranged in the mixing cavity 111, and the mixing cavity 111 has a second inlet 115, a third inlet 117, a fourth inlet 118, and a first outlet 116; the foam concentrate, the liquefied medium, and the water are inputted into the mixing cavity 111 via the third inlet 117, the second inlet 115, and the fourth inlet 118 respectively, mixed, and gasified to produce foams, and the obtained foams are outputted via the first outlet 116 for fire extinguishing. Compared with the mixing device in FIG. 1, a fourth inlet 118 is added in the mixing device in FIG. 12 to input water into the mixing cavity, and the first inlet 114 is omitted, or it may be deemed that the first inlet 114 for supplying foam solution is changed to the fourth inlet 118 for supplying water; compared with the mixing device in FIG. 6, the foam concentrate inlet 117 of the mixing device shown in FIG. 6 is moved backward to the mixing cavity in FIG. 8, and the pipe for mixing foam concentrate and water at the front end is canceled.

The mixing cavity is configured to provide a mixing space for the liquefied medium, foam concentrate and water. Therefore, the mixing cavity may have any structures and shapes, as long as the above-mentioned requirement can be met.

Preferably, the mixing cavity is a cylindrical structure, the second inlet 115, the third inlet 117 and the fourth inlet 118 are arranged at one end of the cylindrical structure, the first outlet 116 is arranged at the other end of the cylindrical structure, the direction of the second inlet 115, the direction of the third inlet 117, and the direction of the fourth inlet 118 form an angle of 0-90° between each other, preferably 30-60°. Since the three inlets are angularly arranged, cross flows are produced when the three liquids are inputted into the mixing cavity, and thereby turbulence is produced and a better mixing effect is attained.

In order to reduce pressure drop and to obtain a better mixing of the foaming material and the liquefied medium, preferably the relation between the diameter D1 of the cylindrical structure and the diameter D4 of the first inlet 116 is: D1/D4=0.8-2, preferably D1/D4=1.2-1.4; the relation between the diameter D1 of the cylindrical structure and the diameter D3 of the second inlet 115 is D1/D3=20-30; the relation between the diameter D1 of the cylindrical structure and the diameter D5 of the fourth inlet 118 is: D1/D5=8-12; the relation between the diameter D6 of the third inlet 117 and the diameter D3 of the second inlet 115 is: D6/D3=10-15.

By making the diameters of the opening meet the above-mentioned relations, the above-mentioned flow relation can be realized without any additional control device, and thereby the foaming can be more extensive, and foams with higher quality can be obtained.

Those skilled in the art can understand that the second inlet 115, the third inlet 117, the fourth inlet 118, and the first outlet 116 are not limited to the arrangements described above. Various modifications or variations may be made to attain a better mixing effect.

As described above, in order to control the flow direction of the liquefied medium inputted into the mixing cavity via the second inlet 115, as shown in FIG. 1, the second inlet 115 may be arranged to extend to an input pipe 17 in the mixing cavity 111.

As described above, one or more disturbing components 112 may be provided in the mixing cavity 111 of the mixing device 11. The structure of the disturbing component 112 has been described above.

Corresponding to the above-mentioned method for foaming that integrates the production of foam solution with foaming, the present disclosure further provides another foam fire-fighting equipment, as shown in FIG. 7, comprising a foam producing unit 1 and a foam spurting unit 2, wherein, the foam producing unit 1 comprises a mixing device 11 having a mixing cavity 111 and a disturbing component 112 arranged in the mixing cavity, the mixing device 11 communicates with a liquefied medium supply device 14, a foam concentrate supply device 15, and a water supply device 16 respectively, and thereby a liquefied medium, a foam concentrate, and water are supplied into the mixing cavity 111 of the mixing device 11 by the liquefied medium supply device 14, the foam concentrate supply device 15, and the water supply device 16 respectively, then mixed under the disturbance of the disturbing component 112 to produce foams, and the produced foams are fed into the foam spurting unit 2.

Figure 11:
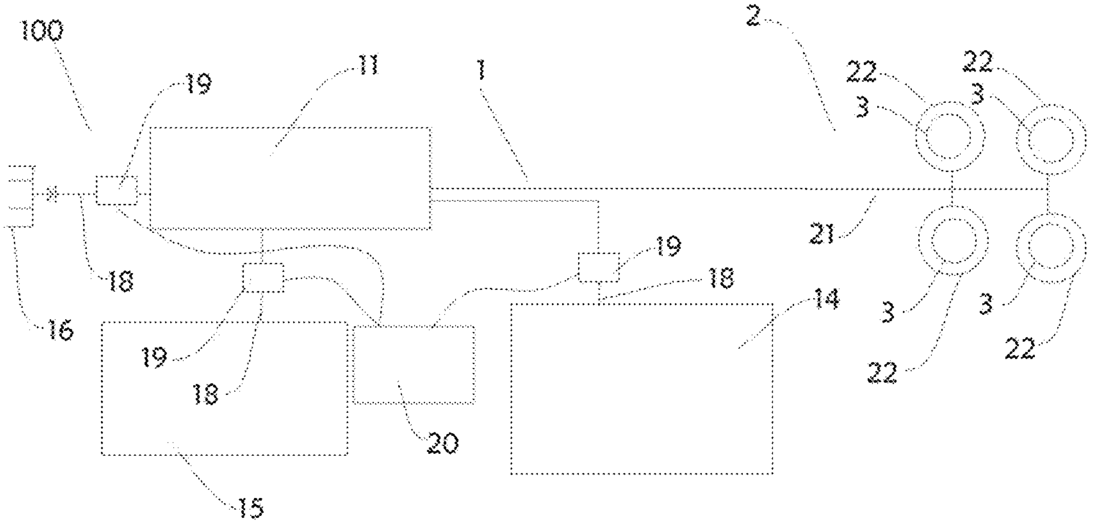
FIGS. 11 and 12 are schematic structural diagrams of the foam producing unit and foam fire-fighting equipment in yet another embodiment of the present disclosure.

Preferably, as shown in FIG. 11, the foam fire-fighting equipment further comprises a plurality of connecting pipes 18 and a plurality of flow regulators 19, which are respectively used to connect the material supply devices with the mixing devices or jetting pipes and carry out flow control.

As shown in FIG. 11, the connecting pipes are referred as first connecting pipe, second connecting pipe, third connecting pipe, and fourth connecting pipe respectively. Wherein, a first end of the first connecting pipe is connected to the outlet of the foam concentrate supply device 15, and a second end of the first connecting pipe is connected to the foam concentrate inlet 21 of the mixed solution producing device 12. A first end of the second connecting pipe is connected to the water supply device 16, and a second end of the second connecting pipe is connected to the water inlet 22 of the mixed solution producing device 12.

A first end of the third connecting pipe is connected to the outlet of the mixed solution producing device 12, and a second end of the third connecting pipe is connected to the foam solution inlet of the mixing device 11. A first end of the fourth connecting pipe is connected to the outlet of the liquid nitrogen cylinder 14, and a second end of the fourth connecting pipe is connected to the liquefied medium inlet 115 of the mixing device 11.

A first flow regulator is provided on the first connecting pipe, a second flow regulator is provided on the second connecting pipe, a third flow regulator is provided on the third connecting pipe, and a fourth flow regulator is provided on the fourth connecting pipe.

The controller 20 is connected with the first flow regulator to control the flow of the foam concentrate in the first connecting pipe, is connected with the second flow regulator to control the flow of the water in the second connecting pipe, is connected with the third flow regulator to control the flow of the foam solution in the third connecting pipe, and is connected with the fourth flow regulator to control the flow of the liquid nitrogen in the fourth connecting pipe. Thus, a better foaming effect can be attained, and the quality of the foams can be improved.

Preferably, each of the first flow regulator, the second flow regulator, the third flow regulator, and the fourth flow regulator may comprise a flow meter and a flow control valve. Each of the flow meters and the flow control valves may be arranged on corresponding one of the first connecting pipe, the second connecting pipe, the third connecting pipe, and the fourth connecting pipe. For example, the flow meter and flow control valve of the first flow regulator may be arranged on the first connecting pipe.

The controller 20 may be connected with each of the flow meters and the flow control valves so as to control the opening of the flow control valve according to the detected value of the flow meter and thereby control the flow of the fluid in the pipe.

In an embodiment, as shown in FIG. 11, the foam fire-fighting equipment 100 further comprises a foam spurting unit 2, which has a foam conveyor pipe and a foam jetting pipe, wherein a foam inlet of the foam conveyor pipe communicates with the foam outlet of the mixing device 11 so that the foams supplied by the mixing device 11 enter the foam spurting unit 2, and an outlet of the foam conveyor pipe communicates with an inlet of the foam jetting pipe so that the foam spurting unit 2 can spurt the foams onto target objects. With the foam spurting unit 2, the foams can be spurted to target objects more conveniently and accurately.

In an embodiment, the foam spurting unit 2 may comprise a foam conveyor pipe 21 and an annular foam jetting pipe 22. The foam jetting pipe 22 is adapted to be arranged around a combustible material storage tank 3 (e.g., a large-size oil storage tank), i.e., the foam jetting pipe 22 is arranged around the combustible material storage tank 3 when it is in an operational state. In other words, the foam jetting pipe 22 may be circular or elliptical.

The foam jetting pipe 22 is provided with a plurality of foam jetting orifices spaced in the circumferential direction of the foam jetting pipe 22. A first end of the foam conveyor pipe 21 is connected to the foam outlet, and a second end of the foam conveyor pipe 21 is connected to the foam jetting pipe 22, i.e., the first end of the foam jetting pipe 22 may be the foam inlet. The foam fire-fighting equipment 100 including the foam spurting unit 2 may be used for fire extinguishing in oil product depots and medium-size oil tank fields.

The embodiment and the foam fire-fighting equipment are highly flexible, applicable to scenarios where the foam concentrate, the fire water, and the liquefied medium are carried by the fire engine, as well as scenarios where the foam concentrate, the fire water, and the liquefied medium are provided at the fire location.

The foam spurting unit of the foam fire-fighting equipment may be a high-spraying fire engine, foam fire engine, trailer-type fire monitor, or fixed foam sprayer, etc., for example. The fixed foam sprayer refers to a fixed foam sprayer on the wall of a tank.

The method for producing foams provided in the present disclosure is applicable to various occasions where foam production is required, such as fire extinguishing, thermal insulation, food production, and sound insulating material production, etc. Specifically, the fire extinguishing may be fire extinguishing for various buildings, large-size facilities, warehouses, chemical plants, oil depots, and production facilities in oil refineries, or fire protection for aircraft runways during forced landing of aircrafts at airports, etc.

Hereunder the present disclosure will be detailed in examples. In the following examples, the fire extinguishing efficiency and foam quality are assessed with the methods specified in the standard “Code for Foam Extinguishing Agent” (GB15308-2006).

In the following examples, unless otherwise stated, all of the raw materials are commercial products.

Example 1

Mixing was carried out in the mixing device as shown in FIG. 1 to produce foams, wherein the mixing device has a mixing cavity in which liquid nitrogen and a foam solution were mixed, one foam solution inlet, one liquid nitrogen inlet, and one foam outlet were arranged in the wall of the mixing cavity, and the foam outlet and the foam solution inlet were located at the two ends of the cylindrical structure respectively. The relation between the diameter D2 of the foam solution inlet and the diameter D3 of the gas inlet is: D2/D3=8; the relation between the diameter D1 of the cylindrical structure and the diameter D2 of the foam solution inlet is: D1/D2=1.4; the relation between the diameter D1 of the cylindrical structure and the diameter D4 of the foam outlet is: D1/D4=1.2; a disturbing component was provided in the mixing cavity, and the disturbing component was formed as a conical structure as indicated by the symbol a in FIG. 2, the conical top of the conical structure faces the foaming material inlet, the cross section of the disturbing component was circular, the relation between the diameter D7 of the disturbing component and the diameter D2 of the foaming material inlet is: D7/D2=1.2, and the distance L between the top of the disturbing component and the outflow opening of liquid nitrogen at the inlet was 10 mm. The liquid nitrogen storage cylinder and the foam solution tank communicate with the gas-liquid mixing device via pipes respectively, and the angle between the direction of the inlet of the liquid nitrogen pipe and the direction of the foam solution inlet was 10°.

1.5 $m^3$ foam solution (3% aqueous film-forming foam liquid product from Jiangsu Jiangya Co., Ltd.) was stored in a 2 $m^3$ foam solution storage tank, the diameter of the liquid conveyor pipe was DN25, the operating pressure in the foam solution storage tank was 1.2 MPa, and the operating pressure in the liquid nitrogen cylinder was 2 MPa.

For extinguishing a fire in 4.52 $m^3$ oil pool specified in the National Standard, the required flow of foam solution was V=11.4 L/min. according to "Code of Design for Foam Extinguishing System" (GB50151-2010). The flow of liquid nitrogen was determined according to the formula Q=mV/nf, where the foaming ratio was set to m=7, n=710, f=1.01. Thus, the flow of liquid nitrogen was determined as 0.11 L/min. Liquid nitrogen and a foam solution were fed into the mixing device shown in FIG. 1 with the above-mentioned flow and mixed to produce foams, and the foams were spurted out from the foam outlet of the mixing device to the fire area for fire extinguishing. Thus, the fire in the 4.52 $m^3$ oil pool specified in the National Standard was extinguished successfully, and it takes 100 s to extinguish the fire, which was much shorter than the time taken by similar foaming materials. By replacing air compressors with liquid nitrogen supply, high-flow foam spurting from a compressed air foam extinguishing apparatus was realized. Measured with the method specified in "Code for Foam Extinguishing Agent" (GB15308-2006), the actual foaming ratio was 7.1, and the 25% durable time was 3 min.

Figure 13:
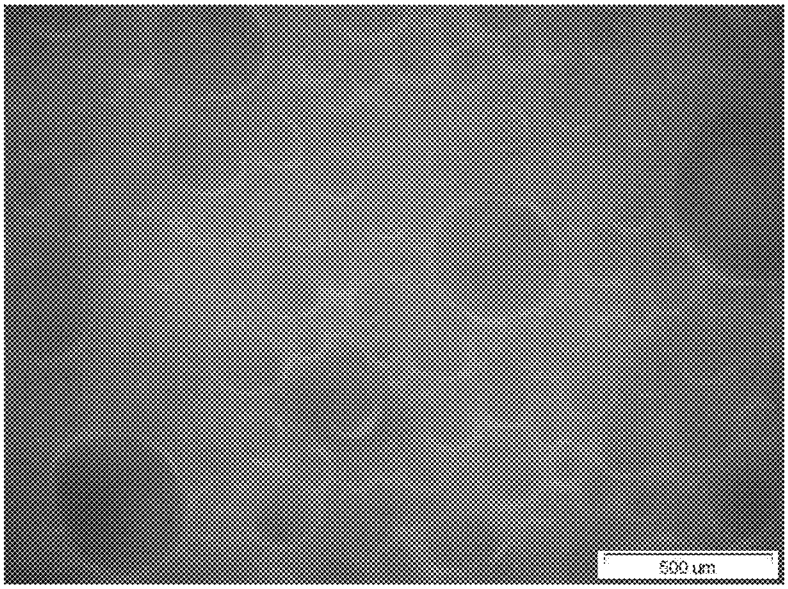
FIGS. 13-15 are microscopic photos of the foams obtained by the method for producing foam in the present disclosure.
Figure 14:
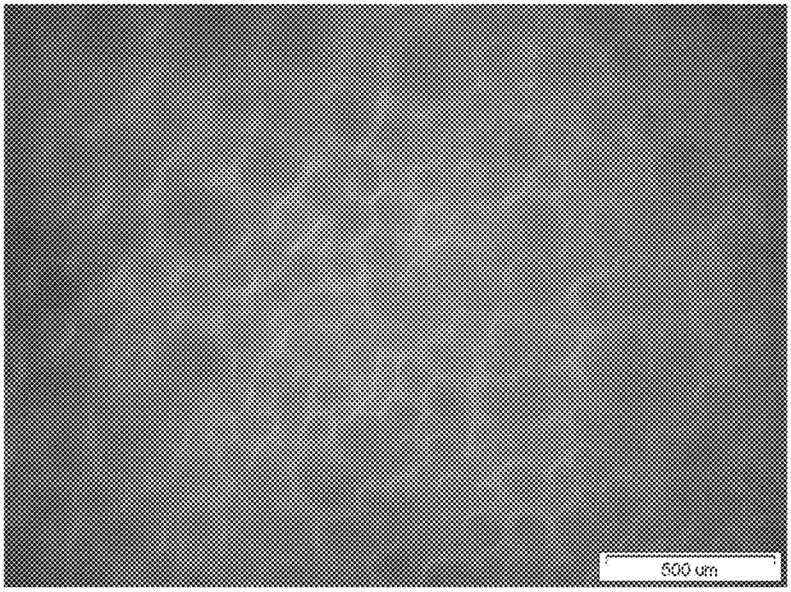
Figure 15:
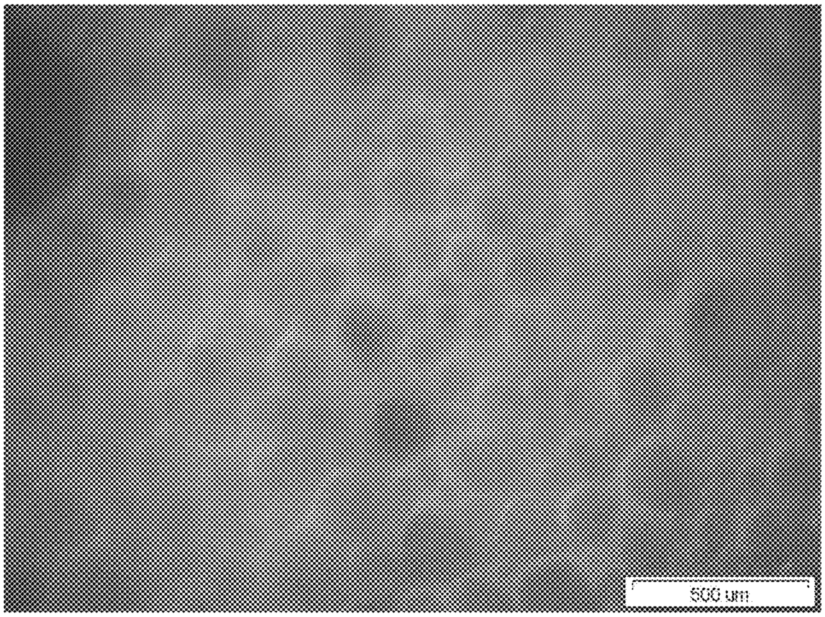
Figure 16:
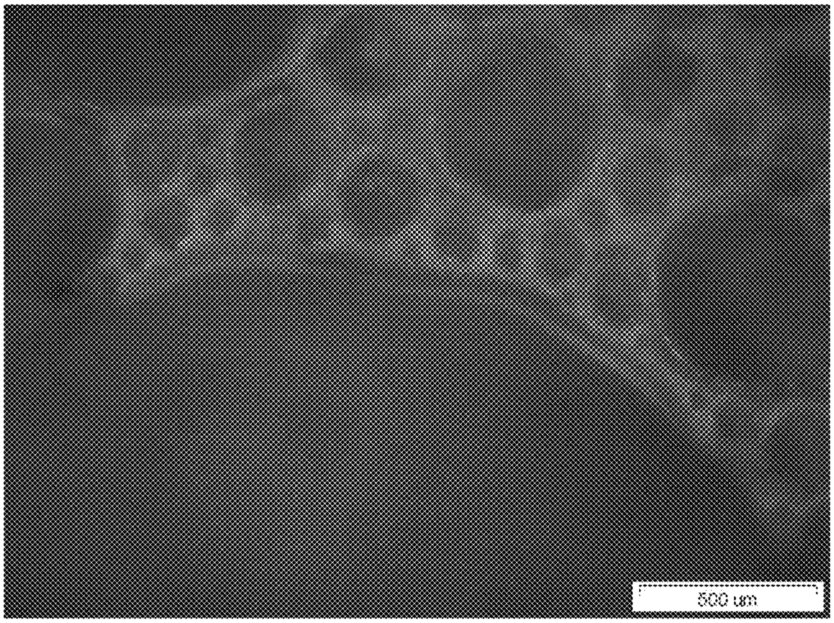
FIGS. 16-19 are microscopic photos of the foams obtained by the method for producing foam in the prior art.
Figure 17:
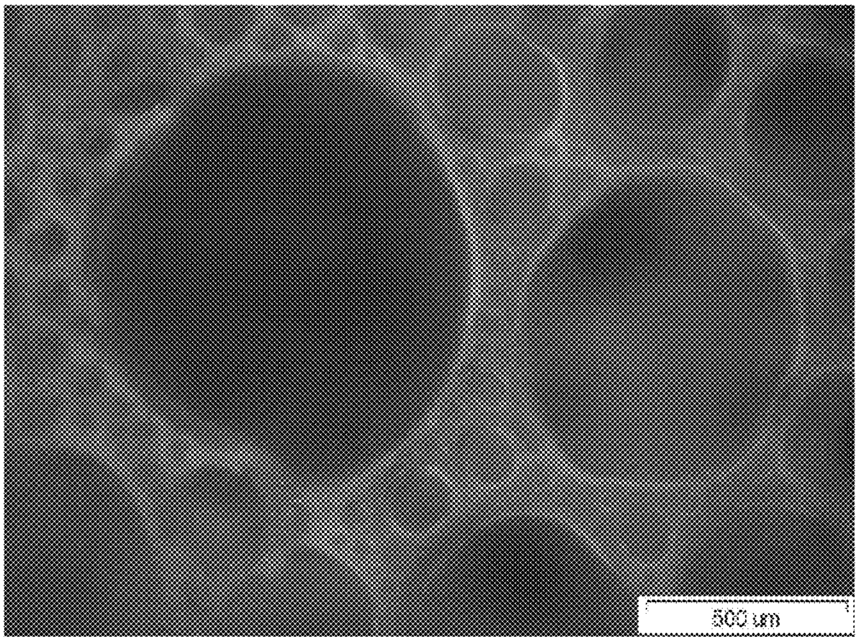
Figure 18:
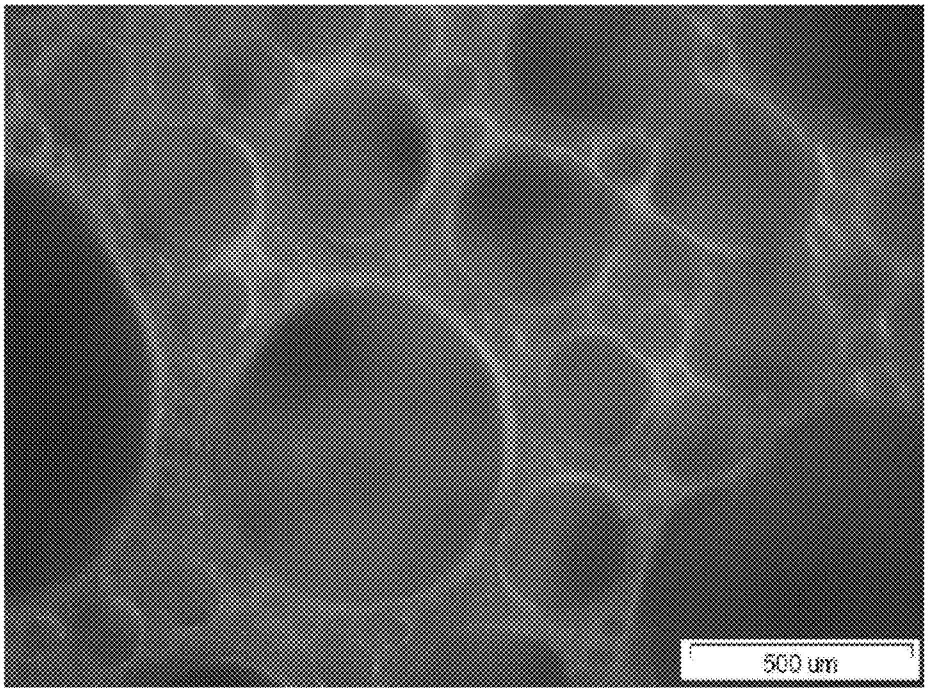
Figure 19:
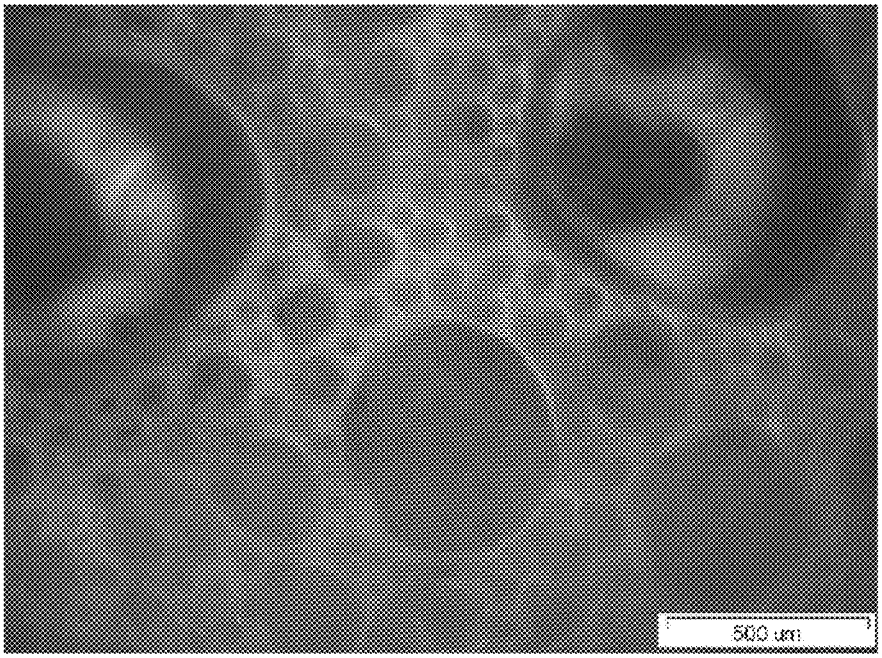

The spurted foams were sampled for several times, and then the samples were magnified under a high-power microscope, and images of the foams were obtained, as shown in FIGS. 13-15. It was seen from FIGS. 13-15: the bubble distribution was relatively uniform, the average diameter of the bubbles was 50-70 μm, and the maximum diameter of the bubbles was 200-300 μm.

Example 2

Mixing was carried out in the mixing device shown in FIG. 1 to produce foams, wherein the mixing device has a mixing cavity in which liquid nitrogen and a foam solution were mixed. one foam solution inlet, one liquid nitrogen inlet, and one foam outlet were arranged in the wall of the mixing cavity, and the foam outlet and the foam solution inlet were located at the two ends of the cylindrical structure respectively. The relation between the diameter D2 of the foam solution inlet and the diameter D3 of the liquid nitrogen inlet is: D2/D3=10; the relation between the diameter D1 of the cylindrical structure and the diameter D2 of the foam solution inlet is: D1/D2=2; the relation between the diameter D1 of the cylindrical structure and the diameter D4 of the foam outlet is: D1/D4=1.2; a disturbing component was provided in the mixing cavity, and the disturbing component was formed as a hemispherical structure as indicated by the symbol b in FIG. 2, the spherical top of the hemispherical structure faces the foaming material inlet, the cross section of the disturbing component was circular, the relation between the diameter D7 of the disturbing component and the diameter D2 of the foaming material inlet is: D7/D2=1.6, and the distance L between the top of the disturbing component and the outflow opening of liquid nitrogen at the inlet was 30 mm. The liquid nitrogen storage cylinder and the foam solution tank communicate with the gas-liquid mixing device via pipes respectively, and the angle between the direction of the inlet of the liquid nitrogen pipe and the direction of the foam solution inlet was 30°.

15 $m^3$ foam solution (the same as the foam solution in the example 1) was stored in a 20 $m^3$ foam solution storage tank, the diameter of the liquid transfer pipe was DN150, the operating pressure in the foam solution storage tank was 0.8 MPa, and the operating pressure in the liquid nitrogen cylinder was 1.5 MPa.

For extinguishing a fire covering 450 $m^2$ area in a 5,000 $m^3$ oil tank field, the required flow of foam solution was V=3,000 L/min. according to "Code of Design for Foam Extinguishing System" (GB50151-2010). The flow of liquid nitrogen was determined according to the formula Q=mV/nf, where the foaming ratio m was 8, n=710, f=1.17. Thus, the flow of liquid nitrogen was determined as 28.9 L/min. Liquid nitrogen and a foam solution were fed with the above-mentioned flow into the mixing device shown in FIG. 1, and mixed to produce foams, and the foams were spurted out from the foam outlet of the mixing device and conveyed via the foam spurting unit to the fire area for fire extinguishing. Thus, the fire covering 450 $m^2$ area in the 5,000 $m^3$ oil tank field was extinguished successfully, and it needs only 25 s. In that way, high-flow foam spurting from a compressed air foam extinguishing apparatus was realized, and the time taken to extinguish fire was much shorter than the time taken by fire-fighting equipment. Measured with the same method as that in the example 1, the foaming ratio was determined as 7.2, and the 25% durable time was 3 min.

The spurted foams were sampled, and the samples were magnified under a high-power microscope, and foam images similar to those in the example 1 were obtained. The bubble distribution was relatively uniform, the average diameter of the bubbles was 50-80 μm, and the maximum diameter of the bubbles was 200-300 μm.

Example 3

Foams were produced and fire extinguishing was carried out with the method described in the Example 2, except that the flow of liquid nitrogen was 22 L/min. Consequently, the time taken for extinguishing fire was extended to 55 s.

Example 4

Foams were produced and fire extinguishing was carried out with the method described in the Example 2, except that the relation between the diameter D2 of the foam solution inlet and the diameter D3 of the gas inlet is: D2/D3=3. Consequently, the time taken for extinguishing fire was extended to 95 s. Measured with the same method as that in the example 1, the actual foaming ratio was 4.2, and the 25% durable time was 1.5 min.

Example 5

Foams were produced and fire extinguishing was carried out with the method described in the Example 2, except that the distance L between the top of the disturbing component 112 and the outflow opening of liquid nitrogen at the inlet 12 was 150 mm. Consequently, the time taken for extinguishing fire was extended to 75 s. Measured with the same method as that in the example 1, the actual foaming ratio was 4.9, and the 25% durable time was 2.1 min.

Example 6

The fire engine comprises a 25 $m^3$ liquid nitrogen storage cylinder and a high-spraying fire engine, the high-spraying fire engine was equipped with a mixing device (the same as the mixing device in the Example 1) and a foam transporter for supplying foam concentrate (aqueous film-forming foam liquid AFFF-3%), the diameter of the jetting pipe of the high-spraying fire engine was DN250, and a 150 L/s (1.0 MPa) fire pump was provided. Water was supplied to the fire engine via a fixed fire water pipe network.

The liquid nitrogen, the foam concentrate, and water were fed into the mixing device at a flow of 189 L/min., 270 L/min., and 8,730 L/min. respectively, and mixed to produce foams, the foams were spurted out from the foam outlet of the mixing device; the flow of the foams was 9,000 L/min., the jetting range was 40 m, and the lifting elevation was 30 m. Measured with the method described in the Example 1, the 25% durable time was 3 min.

The spurted foams were sampled, and the samples were magnified under a high-power microscope, and foam images similar to those in the Example 1 were obtained. The bubble distribution was relatively uniform, the average diameter of the bubbles was 50-70 μm, and the maximum diameter of the bubbles was 150-250 μm.

Comparative Example 1

A negative pressure foaming mechanism was used. Specifically, a foam solution was fed into a negative pressure foam gun (model PQ16) at a flow rate of 960 L/min. at 0.8 MPa pressure, and then foams were spurted. The spurted foams were sampled, and then the samples were magnified under a high-power microscope, and images of the foams were obtained, as shown in FIGS. 12-15. Measured with the method described in the example 1, the 25% durable time was 2.2 min.

It was seen from FIGS. 16-19: the bubbles produced by negative pressure foams were uneven in size, the diameter of the bubbles was 10-800 μm, a large quantity of ineffective foams exist, and the foam layers were instable.

Comparative Example 2

The method disclosed in U.S. Pat. No. 5,497,833 A was used, liquid nitrogen, a foam concentrate, and water were fed into the apparatus disclosed in U.S. Pat. No. 5,497,833A at a flow rate of 189 L/min., 270 L/min., and 8,730 L/min. respectively. Similar to those in the comparative example 1, the obtained foams were uneven in size, a large quantity of ineffective foams exist, and the foam layers have poor stability. Measured with the method described in the example 1, the 25% durable time was 1.2 min.

In addition, a corrugated plate was added as a disturbing component in the jetting pipe. As a result, the jetting range was severely decreased compared with the jetting range in the case without corrugated plate. Specifically, the jetting range was about 60% of the original one, i.e., decreased by about 40%.

Comparative Example 3

Foams were produced and fire extinguishing was carried out with the method described in the example 2, except that no disturbing component 112 was provided in the mixing cavity. Consequently, the time taken for extinguishing fire was extended to 105 s. Measured with the same method as that in the example 1, the actual foaming ratio was 3.9, and the 25% durable time was 1.1 min. The spurted foams were sampled, and the samples were magnified under a high-power microscope, and foam images were obtained. It was found that the foams were similar to those in the comparative example 1. Specifically, the foams were uneven in size, the diameter of bubbles was 10-800 μm, and a large quantity of ineffective foams exist.

While the present disclosure is described above in detail in some preferred embodiments, the present disclosure is not limited to those embodiments. Various simple variations, including combinations of the technical features in any other appropriate way, can be made to the technical scheme of the present disclosure within the scope of the technical concept of the present disclosure, but such variations and combinations shall be deemed as disclosed content in the present disclosure and falling in the protection scope of the present disclosure.

The invention claimed is:

1. A method for producing foam for fire extinguishing, comprising mixing a liquefied medium with a foam solution, and applying a disturbance to strengthen contact between the liquefied medium and the foam solution, wherein:

(i) the mixing is carried out in a mixing device, and the applying a disturbance includes arranging a disturbing component;

(ii) the liquefied medium is liquid nitrogen, and a flow of the liquid nitrogen and a flow of the foam solution meet the following equation: $Q=mV/nf$, wherein Q is a volumetric flow of the liquid nitrogen, m is a preset foaming ratio in a range of 5-200, V is a volumetric flow of the foam solution, n is a volumetric expansion ratio of the liquid nitrogen, and f is a pipeline loss factor in a range of 1-1.4; or (iii) the mixing is performed under conditions including: mixing temperature in a range of −30° C.~60° C., pressure of the liquefied medium in a range of 1-2 MPa, and pressure of the foam solution in a range of 0.8-1.5 Mpa.

2. The method for producing foam according to claim 1, wherein:

(i) the mixing device has a mixing cavity, the disturbing component is disposed in the mixing cavity, the mixing cavity has a first inlet, a second inlet, and a first outlet, the foam solution and the liquefied medium are inputted into the mixing cavity via the first inlet and the second inlet respectively, mixed in the mixing cavity, and then gasified to produce foams, and the produced foams are outputted via the first outlet for fire extinguishing; or (ii) the disturbing component is a conical structure, hemispherical structure, or platform structure.

3. The method for producing foam according to claim 2, wherein:

(i) the mixing cavity is a cylindrical structure, the first inlet and the second inlet are located at one end of the cylindrical structure, the first outlet is located at the other end of the cylindrical structure, and an angle between a direction of the second inlet and a direction of the first inlet is 0-90°;

(ii) at least one porous structure is arranged in a spaced manner in the mixing cavity; each porous structure has a plurality of pores; the pores in the porous structure face the first inlet, and the porous structure is opposite to a top of the disturbing component and away from the first inlet;

(iii) a cross section of the disturbing component is circular, and a relation between a diameter D7 of the disturbing component and a diameter D2 of the first inlet is: D7/D2=1-4; or (iv) a distance L between the top of the disturbing component and an outflow opening of the liquefied medium at the second inlet is 0-100 mm.

4. The method for producing foam according to claim 3, wherein a relation between a diameter D1 of the cylindrical structure and the diameter D2 of the first inlet is: D1/D2=1.1-4; a relation between the diameter D2 of the first inlet and a diameter D3 of the second inlet is: D2/D3=4-10; a relation between the diameter D1 of the cylindrical structure and a diameter D4 of the first outlet is: D1/D4=0.8-2.

5. A method for extinguishing fire, comprising: using the method for producing foam of claim 1 to produce foams, and then outputting the foams for fire extinguishing.

6. A method for producing foam for fire extinguishing, comprising mixing a liquefied medium, water, and a foam concentrate, and applying a disturbance to strengthen contact among the liquefied medium, the foam concentrate, and the water, wherein:

(i) the mixing is carried out in a mixing device, and the applying a disturbance includes arranging a disturbing component;

(ii) a volume ratio of the liquefied medium to the foam concentrate and to the water is 1:1-10:50-300; or (iii) the mixing is performed under conditions including: mixing temperature in a range of −30° C.~60° C., pressure of the liquefied medium in a range of 1-2 MPa, pressure of the foam concentrate in a range of 0.8-1.5 MPa, and pressure of the water in range of 0.6-1.4 MPa.

7. A method for producing foam for fire extinguishing, comprising mixing a liquefied medium, water, and a foam concentrate, and applying a disturbance to strengthen contact among the liquefied medium, the foam concentrate, and the water, wherein:

(i) the mixing device has a mixing cavity, and the disturbing component is arranged in the mixing cavity, the mixing cavity has a first inlet, a second inlet, a third inlet, and a first outlet; the liquefied medium, water, and the foam concentrate are inputted into the mixing cavity via the first inlet, the second inlet, and the third inlet, respectively, mixed, and gasified to produce foams, and the foams are outputted via the first outlet for fire extinguishing;

(ii) the disturbing component is a conical structure, hemispherical structure, or platform structure.

8. The method for producing foam according to claim 7, wherein:

(i) the mixing cavity is a cylindrical structure, the first inlet, the second inlet, and the third inlet are arranged at one end of the cylindrical structure, the first outlet is arranged at the other end of the cylindrical structure, a direction of the first inlet, a direction of the second inlet, and a direction of the third inlet form an angle of 0-90° between each other;

(ii) at least one porous structure is arranged in a spaced manner in the mixing cavity; each porous structure has a plurality of pores; the pores in the porous structure face the first inlet, and the porous structure is opposite to a top of the disturbing component and is away from the first inlet;

(iii) a cross section of the disturbing component is circular, and a relation between a diameter D7 of the disturbing component and a diameter D1 of the cylindrical structure is: D1/D7=1.2-4; or (iv) a distance L between the top of the disturbing component and an outflow opening of the liquefied medium at the first inlet is 0-100 mm.

9. The method for producing foam according to claim 8, wherein a relation between the diameter D1 of the cylindrical structure and a diameter D4 of the first outlet is: D1/D4=0.8-2; a relation between the diameter D1 of the cylindrical structure and a diameter D3 of the first inlet is D1/D3=20-30; a relation between the diameter D1 of the cylindrical structure and a diameter D5 of the third inlet is: D1/D5=2-6; a relation between a diameter D6 of the second inlet and a diameter D3 of the first inlet is: D6/D3=10-15.

* * * * *